United States Patent
Aoyagi et al.

(10) Patent No.: US 8,742,644 B2
(45) Date of Patent: Jun. 3, 2014

(54) POWER GENERATION APPARATUS

(71) Applicants: Rohm Co., Ltd., Kyoto (JP); Kansai University, Osaka (JP)

(72) Inventors: Seiji Aoyagi, Osaka (JP); Yasuhiro Yoshikawa, Kyoto (JP)

(73) Assignees: Rohm Co., Ltd., Kyota (JP); Kansai University, Osaka (JP)

( * ) Notice: Subject to any disclaimer, the term of this patent is extended or adjusted under 35 U.S.C. 154(b) by 0 days.

(21) Appl. No.: 13/646,085

(22) Filed: Oct. 5, 2012

(65) Prior Publication Data

US 2013/0026880 A1    Jan. 31, 2013

Related U.S. Application Data

(63) Continuation of application No. 12/582,903, filed on Oct. 21, 2009, now Pat. No. 8,304,958.

(30) Foreign Application Priority Data

Sep. 15, 2009    (JP) ................................. 2009-213155

(51) Int. Cl.
    *H02N 1/00*    (2006.01)
(52) U.S. Cl.
    USPC ........................................................ 310/309
(58) Field of Classification Search
    USPC ................... 310/309, 300; 307/400; 367/170;
                                       381/91; 322/2 R, 2 A
    See application file for complete search history.

(56) References Cited

U.S. PATENT DOCUMENTS

| | | | |
|---|---|---|---|
| 4,754,185 A | 6/1988 | Gabriel et al. | |
| 4,814,657 A | 3/1989 | Yano et al. | |
| 5,055,731 A | 10/1991 | Nihei et al. | |
| 5,064,083 A * | 11/1991 | Alexander et al. | 215/247 |
| 6,750,590 B2 | 6/2004 | Potter | |
| 7,137,300 B2 | 11/2006 | Aoyagi et al. | |
| 7,898,096 B1 | 3/2011 | Krupenkin | |
| 2004/0239341 A1* | 12/2004 | Aoyagi et al. | 324/661 |
| 2006/0019421 A1 | 1/2006 | Jujii et al. | |
| 2006/0113862 A1* | 6/2006 | Suzuki et al. | 310/309 |
| 2008/0122313 A1 | 5/2008 | Mabuchi et al. | |
| 2009/0079295 A1* | 3/2009 | Naruse et al. | 310/300 |
| 2009/0174281 A1* | 7/2009 | Lo et al. | 310/300 |
| 2011/0062820 A1 | 3/2011 | Aoyagi et al. | |

FOREIGN PATENT DOCUMENTS

JP    2009-077614    4/2009

OTHER PUBLICATIONS

Lo et al., "A simple micro electret power generator," MEMS 2007 Kobe, Japan, Jan. 21-25, 2007.

(Continued)

*Primary Examiner* — Burton Mullins
*Assistant Examiner* — Eric Johnson
(74) *Attorney, Agent, or Firm* — Fish & Richardson P.C.

(57) ABSTRACT

A power generation apparatus includes a dielectric, a movable member being opposed to the dielectric with a predetermined distance, and an electret and an opposing electrode that are formed on the surface of the movable member facing the dielectric so as to generate a fringe electric field penetrating the dielectric between the two electrodes. When the volume occupancy of the dielectric between the electret and the opposing electrode varies in accordance with a displacement of the movable member, the power generation apparatus outputs the electric charge induced in the opposing electrode as electric current.

15 Claims, 37 Drawing Sheets

(56) References Cited

OTHER PUBLICATIONS

Tsutsumino et al., "Efficiency Evaluation of Micro Seismic Electret Power Generator," Proceedings of 23re Sensor Symposium, p. 521-524, 2006 (no month provided).

Paracha et al., "A high power density electrostatic vibration to electric energy converter based on in-plane overlap plate (IPOP) mechanism," DTIP 2007 of MEMS and MOEMS, Strasa, Italy Apr. 25-27, 2007.

Takahashi et al., "Electret Energy Harvesting Based on Fringe Electric Field Change Inside Trenched Ferroelectric," MEMS 2011, Cancun Mexico, Jan. 23-27, 2011.

Suzuki et al., "Fabrication of Highly Dielectric NANO-BAITO3/Epoxy Resin Composite Plate having Trenches by Mold Casting and its Application to Capacitance Energy Harvesting," Transducers '11, Bejing, 6, 5-9, China 2011.

\* cited by examiner

POWER GENERATION APPARATUS

CROSS-REFERENCE TO RELATED APPLICATIONS

This application is based on Japanese Patent Application No. 2009-213155 filed on Sep. 15, 2009.

BACKGROUND OF THE INVENTION

1. Field of the Invention

The present invention relates to a power generation apparatus for converting kinetic energy (vibrational energy) into electric energy, and particularly to a vibration drive capacitive power generation apparatus that is manufactured by using micro electromechanical system (MEMS) technology.

2. Description of Related Art

FIG. 54 is a schematic diagram illustrating a conventional example of a vibration power generation apparatus that is manufactured by using the MEMS technology. The vibration power generation apparatus of the conventional example has a structure including an upper unit U1 and a lower unit U2 that are manufactured separately by using a bulk MEMS technology and then are glued to each other.

In FIG. 54, numeral 100 denotes parylene (registered trademark), numeral 101 denotes a silicon substrate, numeral 102 denotes a silica layer, numeral 103 denotes an electret, numeral 104 denotes an opposing electrode, numeral 105 denotes a base electrode, numeral 106 denotes Pyrex (registered trademark), and numeral 107 denotes a spacer.

The principle of operation of the vibration power generation apparatus having the above-mentioned structure is that an overlapping area between the electret 103 and the opposing electrode 104 is varied by vibration in the two dimensional plane direction (X direction and Y direction), and a variation of electric charge induced to the opposing electrode 104 is extracted as current.

Further, as a related art of the vibration power generation apparatus that is manufactured by using the MEMS technology, there is, for example, JP-A-2009-77614 (hereinafter referred to as Patent Document 1).

However, in the conventional vibration power generation apparatus described above, the generated power is approximately 10 µW, which can be used for a limited application.

In addition, the above-mentioned conventional vibration power generation apparatus has a structure in which the electret 103 and the opposing electrode 104 face each other. Therefore, if a gap distance between the upper unit U1 and the lower unit U2 is designed too small, electrostatic attraction acts between the electret 103 and the opposing electrode 104 so that they contact with each other, or injected electric charge of the electret 103 may be discharged. Therefore, the gap distance between the upper unit U1 and the lower unit U2 should be designed to be a certain value. However, in order to increase the gap distance and still to obtain a large variation of capacitance by the vibration, it is necessary to design areas of the electret 103 and the opposing electrode 104 to be large. As a result, it is required to increase the gap distance more. Because of this vicious circle, the above-mentioned conventional vibration power generation apparatus is designed, for example, to have a gap distance of approximately 70 µm and a lateral dimension of the electret 103 of approximately 150 µm. Therefore, there is plenty of room for improvement in downsizing the apparatus.

Further, in the above-mentioned conventional vibration power generation apparatus, electric charge injection (electrification) into the electret 103 is performed in a noncontact manner by using corona discharge (atmospheric discharge) before gluing the upper unit U1 and the lower unit U2 to each other. However, a large scale of corona discharge equipment is necessary for perform such the electric charge injection process, which is disadvantage in manufacturing cost.

SUMMARY OF THE INVENTION

In view of the above-mentioned problem, it is an object of the present invention to provide a compact power generation apparatus with high output.

To achieve the above-mentioned object, a power generation apparatus according to the present invention includes a dielectric, a movable member being opposed to the dielectric with a predetermined distance, and an electret and an opposing electrode that are formed on the surface of the movable member facing the dielectric so as to generate a fringe electric field penetrating into the dielectric between the two electrodes. When the volume occupancy of the dielectric between the electret and the opposing electrode varies in accordance with a displacement of the movable member, the power generation apparatus outputs the electric charge induced in the opposing electrode as electric current.

Note that other features, elements, steps, merits and characteristics of the present invention will be clarified by the following detailed description of the best mode embodiment and the attached drawings.

DETAILED DESCRIPTION OF THE PREFERRED EMBODIMENTS

Figure 1:
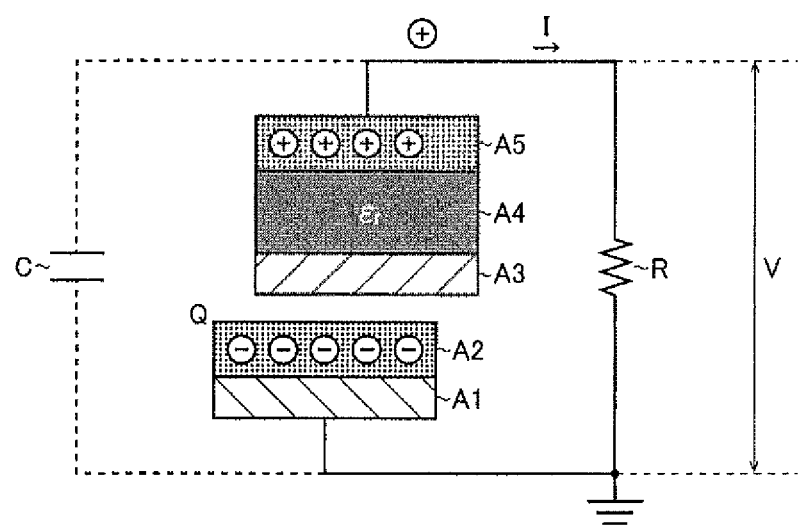
FIG. 1 is an electric model diagram of an opposing electrode power generation apparatus using a ferroelectric PZT plate.

In this specification, a vibration drive power generation apparatus is proposed for a purpose of energy harvesting. In this power generation apparatus, electrets and opposing electrodes that are arranged alternately are formed on the same surface of a lower portion of a proof mass. The power generation apparatus proposed in this specification has the following characteristics. A first characteristic is that a fringe electric field formed in a ferroelectric substrate is utilized. A second characteristic is that a variation of volume occupancy of a dielectric between two electrodes is utilized. A third characteristic is that ferroelectric having a large relative permittivity of 1,000 or larger is used not as a movable member but as a substrate. A fourth characteristic is that a capacitance variation larger than before can be expected with respect to a movement of a proof mass. A fifth characteristic is that surface micromachining can be used so that the structure including electrical wiring can be simplified for reducing manufacturing cost. Note that this specification describes calculation of electric field and a survey on capacitance variation for confirming validity of the proposed principle of operation, and a finite element method (FEM) simulation is used for the calculation and the survey. An MEMS manufacturing process is designed for a power generation system constituted of three devices corresponding to a multi-axial direction (X axis direction, Y axis direction and Z axis direction). As a first step for manufacturing the device, a predetermined amount of electric charge is injected appropriately in a polymer film (CYTOP (registered trademark) film) that is formed in a comb teeth shape.

(First Section—Introduction)

In recent years, a micro power generation system is getting the attention in the fields of batteries, thrusters and the like. A vibration drive power generation apparatus is reported as a battery for low power consumption application such as ubiquitous sensor network or mobile communication. Compared with an electromagnetic type or a piezoelectric type, an electrostatic power generation apparatus is considered to be advantageous in compatibility with a micromachining technology and with vibration in a low frequency band of a few tens Hz or lower. There are some reports of surveying power generation capacity of capacitive vibration drive power generation apparatuses in which the micromachining process is used. Note that the vibration drive power generation apparatus utilizes an electret. The electret is an element that holds the injected electric charge for a long time, i.e., semipermanently. This specification also puts emphasis on a capacitive MEMS power generation apparatus that uses the electret.

In the reported capacitive power generation apparatus described above, a gas such as air or a vacuum (relative permittivity $\in$=1) is used as an insulator between the two electrodes. If the insulator is replaced with a ferroelectric, e.g., PZT or $BaTiO_3$ having a relative permittivity $\in$ that is much higher than that of the insulator (the relative permittivity $\in$ is usually 1,000 or larger), a higher power generation output can be expected. In addition, the reported capacitive power generation apparatus described above usually utilizes vibration in a single direction. In order to recover kinetic energy due to random movements of a human body, it is more preferable to adopt a power generation apparatus that utilizes multi-axial vibration.

In view of this situation, the inventor of this application aims at developing an electret power generation system in accordance with a variation of capacitance generated by movement of a proof mass. This electret power generation system has the following two characteristics. A first characteristic is that the above-mentioned power generation apparatus can generate electric current not only from vibration in the horizontal direction but also by vibration in the vertical direction. This is useful for improving efficiency of energy recovery. A second characteristic is that the above-mentioned power generation apparatus utilizes not only an overlapping area and/or a gap distance between two electrodes but also a variation of volume occupancy of a dielectric between two electrodes.

In order to achieve the latter purpose, the inventor of this application has reported a power generation apparatus that uses ferroelectric PZT (having a relative permittivity $\in_r$ of 2,600) as the proof mass for a purpose of obtaining a very large variation of capacitance. The principle of this electret power generation apparatus is illustrated schematically in FIG. 1. FIG. 1 is an electric model diagram of an opposing electrode power generation apparatus using a ferroelectric PZT plate. In FIG. 1, A1 denotes a base electrode, A2 denotes an electret, A3 denotes a parylene, A4 denotes a PZT plate, and A5 denotes an opposing electrode. Initially, a predetermined amount of electric charge Q is trapped in the electret A2 on the base electrode A1. Therefore, when a variation occurs in a capacitance value C between two electrodes (the electret A2 and the opposing electrode A5), a part of the electric charge Q is induced to the opposing electrode A5, so that current I is supplied to the external circuit. Note that the capacitance value C is expressed by the following equation (1).

$$C = \in_r \in_o S/d \qquad (1)$$

In the above equation (1), $\in_o$ denotes a dielectric constant of air, S denotes an overlapping area between the two electrodes opposed to each other, and d denotes a gap distance between the two electrodes. When the proof mass is driven to vibrate in the horizontal direction, the above-mentioned overlapping area S varies so that the capacitance value C varies by $\Delta C$. Note that the product of the relative permittivity $\in_r$ and the overlapping area S affects the capacitance value C. Therefore, it should be noted that a larger variation ΔC can be obtained if the relative permittivity $\in_r$ is larger. On the other hand, when the proof mass is driven to vibrate in the vertical direction, the above-mentioned gap distance d varies so that the capacitance value C varies by ΔC. In this case too, it is preferable that the relative permittivity $\in_r$ is larger because of the same reason as described above.

Figure 2A:
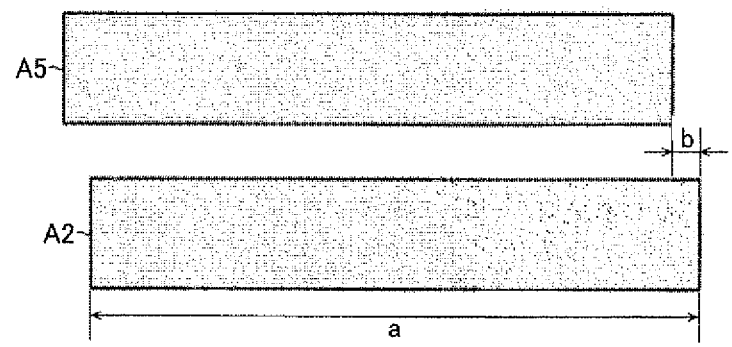
FIG. 2A is a schematic diagram for illustrating an effect of splitting an electret to be a comb teeth member (without a comb teeth process)
Figure 2B:
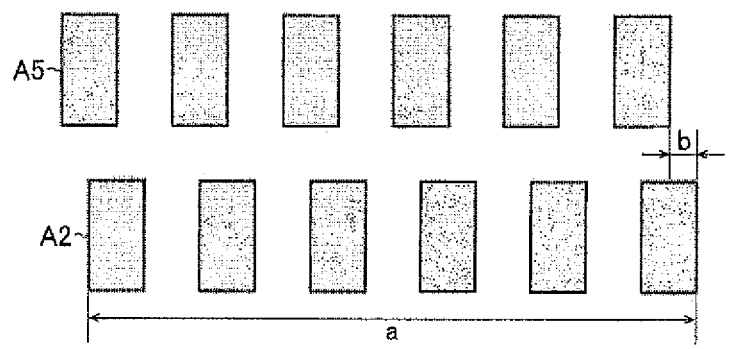
FIG. 2B is a schematic diagram for illustrating the effect of splitting an electret to be a comb teeth member (with a comb teeth process)

However, the reported power generation apparatus described above has one problem. In the conventional capacitive power generation apparatus including this power generation apparatus, the electret A2 should be split into comb teeth portions as illustrated in FIGS. 2A and 2B (that are schematic diagrams for illustrating an effect of splitting the electret into comb teeth portions) so as to increase the variation ΔC of the capacitance value C when the proof mass is moved in the horizontal direction. The reason is as follows. Comparing the variation ratio of the overlapping area in the structure of FIG. 2A with that in the structure of FIG. 2B, the former is b/a while the latter is 2nΔ(b/a), where n denotes the number of the comb teeth. Therefore, the latter is n times the former as the area variation ratio with respect to the same horizontal displacement.

In this case, in order to maximize the overlapping area S between the two electrodes for a purpose of increasing the power generation amount, it is necessary to achieve precise registration between the comb teeth electret A2 and the corresponding comb teeth opposing electrode A5. A conventional capacitive power generation apparatus is usually constituted of a member supporting the electret A2 and a member supporting the opposing electrode A5. These members are manufactured separately and are finally glued to be opposed to each other with a very small gap distance. However, in this assembling structure, it is very difficult to achieve the precise registration between the electret A2 and the opposing electrode A5.

Figure 3A:
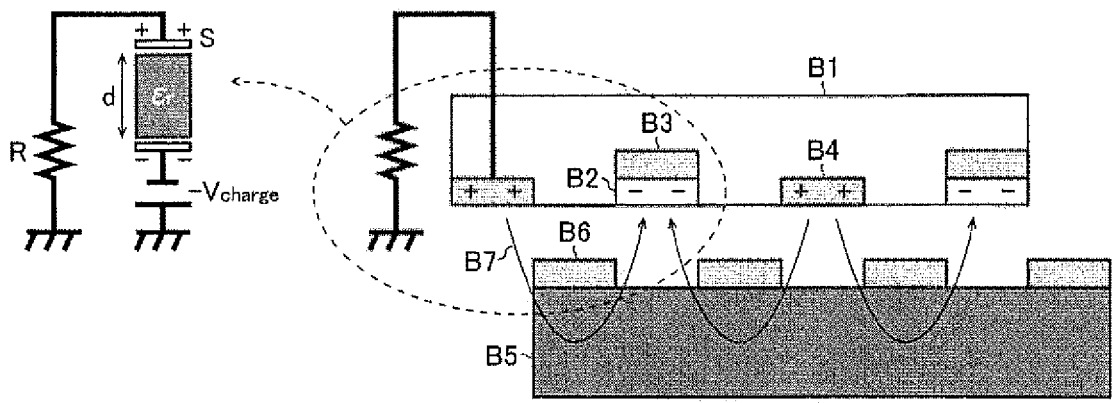
FIG. 3A is a schematic diagram for illustrating a principle of electricity generation (initial position of a movable member)
Figure 3B:
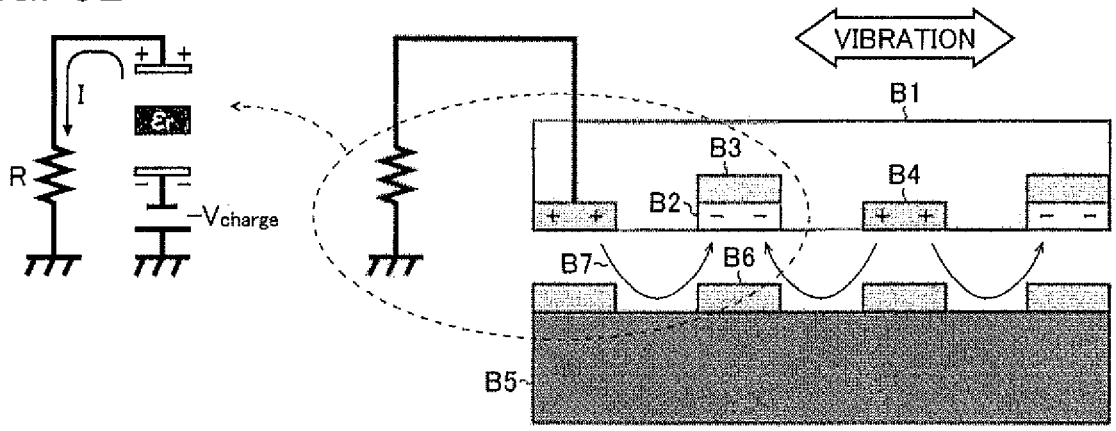
FIG. 3B is a schematic diagram for illustrating a principle of electricity generation (after horizontal displacement of the movable member)
Figure 3C:
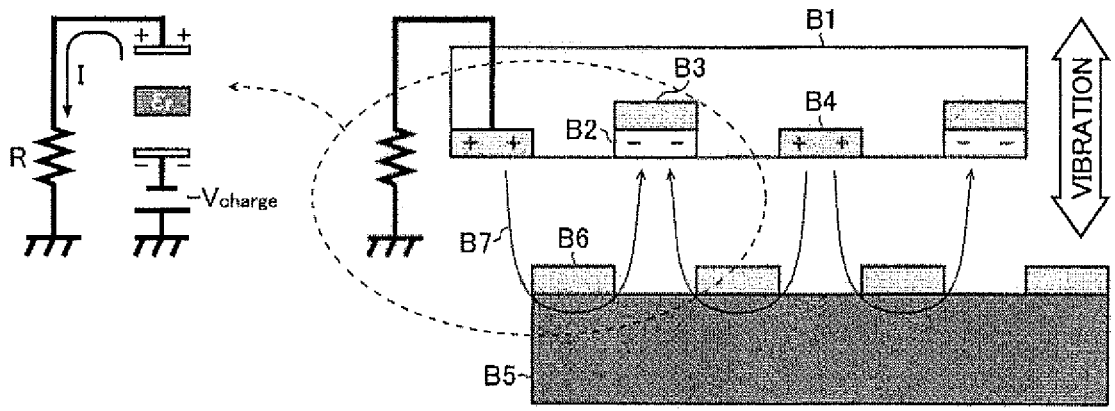
FIG. 3C is a schematic diagram for illustrating a principle of electricity generation (after vertical displacement of the movable member)

In order to solve this problem, the capacitive power generation apparatus in which the surface micromachining can be used is proposed in this specification. Further, as illustrated in FIGS. 3A to 3C, the comb teeth electret B2 and opposing electrode B4 are formed on the same surface in the lower portion of the proof mass B1 in the power generation apparatus. This arrangement is achieved precisely by using a single mask according to a photolithography technique. In addition, electric wiring is necessary only on the surface of the proof mass B1 but is not necessary on the surface of the substrate B5. Therefore, it can be expected to simplify the structure so as to reduce manufacturing cost. In addition, in the power generation apparatus, the proof mass B1 is disposed above the ferroelectric substrate B5 made of BaTiO$_3$ or the like formed by screen printing on a bulk PZT or a ceramic substrate. A ferroelectric material is usually difficult to be etched. Therefore, in the power generation apparatus proposed here, the ferroelectric is used not as the suspended proof mass B1 but as the substrate B5 in view of the actual manufacturing process. This structure is one of characteristics of the power generation apparatus proposed here. The fringe electric field B7 formed in the ferroelectric substrate B5 is effectively used, and detailed principle thereof will be described later.

The original characteristics of the power generation apparatus proposed here can be summarized as follows. A first characteristic is to utilize the fringe electric field that is formed between two electrodes (i.e., the electret and the opposing electrode) that are arranged alternately. A second characteristic is to utilize a variation of volume occupancy of the dielectric between the two electrodes. A third characteristic is that the ferroelectric having a relative permittivity of 1,000 or larger is used not as the proof mass but as the substrate. A fourth characteristic is that a capacitance variation larger than before can be expected with respect to a movement of a proof mass, so that larger power generation amount can be obtained by the above-mentioned designs. A fifth characteristic is that surface micromachining can be used so that the structure including electrical wiring can be simplified for reducing manufacturing cost.

In addition, contents of this specification described below are organized as follows. The next section (Second section) describes a concept of the power generation apparatus proposed here and the principle of operation. Third section describes a finite element method (FEM) simulation for performing the calculation of electric field and the survey on variation of capacitance. Fourth section describes a manufacturing process of the power generation apparatus. Fifth section describes injection of a predetermined amount of electric charge into a polymer CYTOP film prior to the actual production of the power generation apparatus. This is carried out to find out possibility of manufacturing the electret by using the facility in the laboratory.

(Second Section—Concept and Principle of Operation)

2.1 Structure of the Apparatus

In this section, the concept and the principle of operation will be described with reference to FIGS. 3A to 3C. Each of FIGS. 3A to 3C is a schematic diagram for describing the principle of electricity generation. FIGS. 3A to 3C respectively illustrate a state where the movable member is at an initial position, a state after the movable member is moved horizontally, and a state after the movable member is moved vertically. In FIGS. 3A to 3C, B1 denotes the proof mass (movable member), B2 denotes the electret, B3 denotes the base electrode, B4 denotes the opposing electrode, B5 denotes the ferroelectric substrate, B6 denotes a floating electrode, and B7 denotes the fringe electric field.

The electret B2 is made of a polymer material (e.g., CYTOP in this embodiment) formed adjacent to the base electrode B3 that is electrically grounded. The comb teeth electret B2 is formed on the under surface of a movable member B1 made of an insulator (e.g., SU-8 or parylene in this embodiment) as illustrated in FIGS. 3A to 3C. The comb teeth opposing electrode B4 is formed on the under surface of the movable member B1 similarly to the electret B2. In other words, two electrodes (i.e., the electret B2 and the opposing electrode B4) are formed and arranged alternately on the under surface of the movable member B1. The fringe electric field B7 is formed between the two electrodes. Using the fringe electric field B7, it is possible to use surface micromachining that is more preferable for manufacturing and cost.

Using the MEMS technology, the movable member B1 is formed above the ferroelectric substrate B5 made of BaTiO$_3$ or the like on the PZT plate or a ceramic plate. Here, it is known that an electric flux line penetrates into a dielectric but cannot penetrate into an electric conductor. Therefore, the metal floating electrode B6 having a comb teeth shape is formed on a surface of the ferroelectric substrate B5. Note that the metal floating electrode B6 formed on the surface of the ferroelectric substrate B5 is electrically floating, i.e., is not connected to the ground terminal or a power supply terminal.

2.2 Principle of Operation in Horizontal Vibration

When the movable member B1 is moved in the horizontal direction by an external vibration input, a relative positional relationship between the fringe electric field B7 and the floating electrode B6 varies as compared with reference to FIGS. 3A and 3B, so that the state of the electric flux line penetrating into the ferroelectric substrate B5 varies. In other words, the electric flux line can easily penetrate into the ferroelectric substrate B5 in the initial position of the movable member B1 (see FIG. 3A), but the electric flux line is blocked with the floating electrode B6 and can hardly penetrate into the ferroelectric substrate B5 in the position of the movable member B1 after the horizontal displacement (see FIG. 3B). This fact means that the capacitance C formed between the electret B2 and the opposing electrode B4 (i.e., $\in_r \in_0 S/d$, see First section about meanings of the symbols) varies. This variation occurs in accordance with a variation of a volume ratio of the dielectric to air between two electrodes, i.e., a variation of equivalent relative permittivity $\in_r$.

Along with the variation of capacitance between two electrodes, a predetermined amount of electric charge Q is induced in the opposing electrode B4. Then, the electric charge Q is derived as current I based on the following equation (2).

$$I = dQ/dt = V_{charge} \cdot dC/dt \quad (2)$$

Note that $V_{charge}$ represents surface voltage of the electret B2 in the equation (2). On the left side of each of FIGS. 3A and 3B, there is an equivalent circuit illustrating schematically the concept and the principle of operation of the power generation apparatus proposed here.

As understood from the equation (2), it should be noted that a larger value of the relative permittivity $\in_r$ is desirable for generating a large current I. The equation (2) indicates that it is important to adopt a material having high relative permittivity, i.e., a ferroelectric as the material of the substrate B5.

2.3 Principle of Operation in Vertical Vibration

It is supposed that the movable member B1 is moved in the vertical direction as compared with reference to FIGS. 3A and 3C. When the vertical distance between the movable member B1 and the substrate B5 decreases, the equivalent relative permittivity $\in_r$ increases. On the contrary, when the vertical distance between the movable member B1 and the substrate B5 increases, the equivalent relative permittivity $\in_r$ decreases. Therefore, the power generation is performed based on the same principle as the case of the vibration in the horizontal direction.

(Third Section—FEM Simulation of the Variation of Capacitance)

3.1 Conditions of the Simulation

Figure 4:
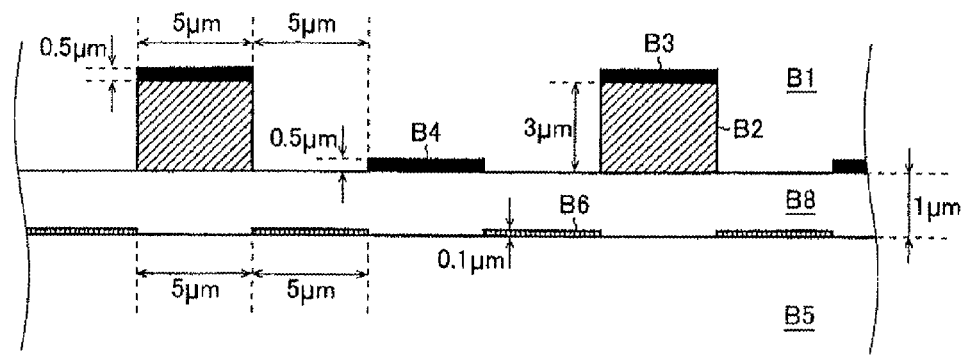
FIG. 4 is a diagram of a simulation model.

In this section, the principle of operation described above is confirmed theoretically. It is difficult to calculate the fringe electric field in an analyzing manner. Therefore, the FEM simulation was performed so as to know the relationship between the variation of capacitance and the movement of proof mass. FEMLAB of Comsol Corporation was adopted as FEM software. Conditions of the simulation are illustrated in FIG. 4. Note that symbols in FIG. 4 are the same as those in FIGS. 3A to 3C. B1 denotes the proof mass (made of parylene ($\in_r=3.15$)), B2 denotes the electret (made of CYTOP ($\in_r=2.1$), surface voltage=$-300$V), B3 denotes the base electrode (0 V), B4 denotes the opposing electrode (0 V), B5 denotes the substrate (made of PZT ($\in_r=2,600$) or SiO$_2$ ($\in_r=3.1$)), and B6 denotes the floating electrode. In addition, B8 denotes the air in the gap. As illustrated in FIG. 4, a two-dimensional (2D) model was adopted in this FEM simulation considering symmetry. As to structure, materials and dimensions, a concrete manufacturing process designed for an actual power generation apparatus (that is described in detail in Fourth section) is referred.

To check an effect of using a ferroelectric as the substrate, not only PZT ($\in_r=2,600$) but also SiO$_2$ ($\in_r=3.1$) was used as a material of the substrate B5 for comparison.

A total capacitance value of an analysis space is calculated by integral of electric data of every FEM element in the following equation (3).

$$C = \frac{2W_e}{V_{charge}^2} = \frac{2}{V_{charge}^2} \int_S 0.5(E_x D_x + E_y D_y) ds \quad (3)$$

In the equation (3), $W_e$ denotes total electric energy, $V_{charge}$ denotes surface voltage of the electret B2 (having an assumed value of $-300$V, see Fifth section). E denotes the electric field, and D denotes electric displacement amount. Using the above-mentioned parameter values in the analysis space, a total capacitance value of 1 mm×1 mm plate is calculated.

3.2 Result of the Simulation

From a result of the simulation concerning distribution of the electric flux line and a potential, it was confirmed that the electric flux line securely penetrates into the ferroelectric substrate B5 through it is blocked partially with the floating electrode B6.

Figure 5:
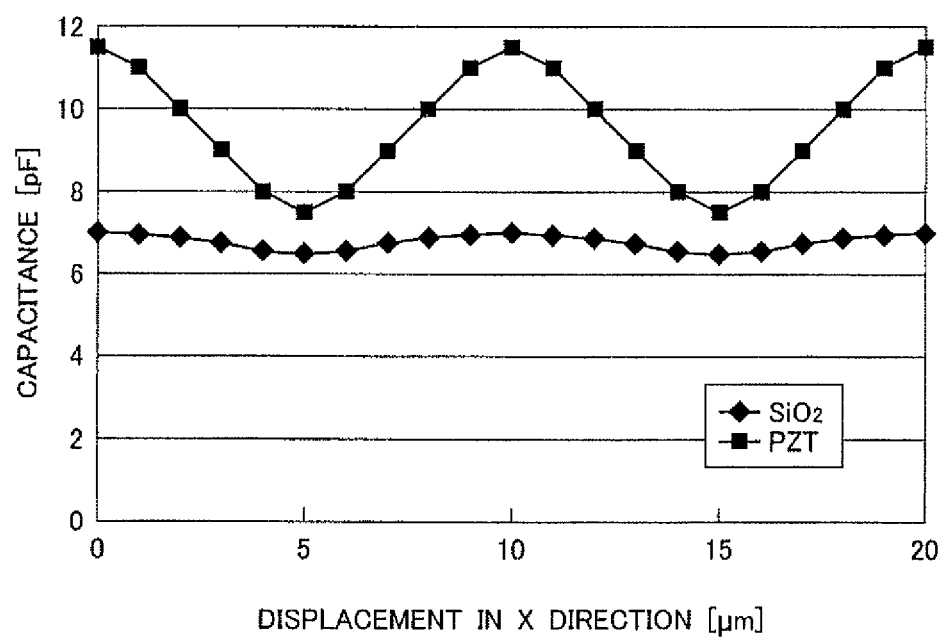
FIG. 5 is a graph illustrating a variation of capacitance with respect to a displacement in the X direction (horizontal direction).
Figure 6:
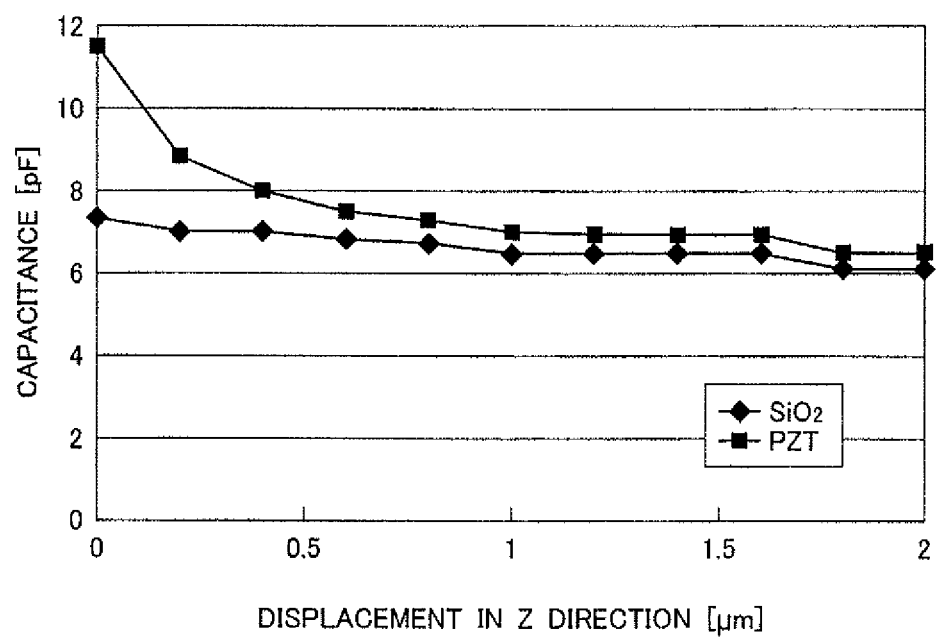
FIG. 6 is a graph illustrating a variation of capacitance with respect to a displacement in the Z direction (vertical direction).

In addition, the capacitance C in accordance with the equation (1) is obtained from the displacement of the proof mass B1. A result of the simulation of the variation of capacitance in accordance with the mass displacement in the horizontal direction (X direction) from the initial position (see FIG. 3A) is shown in FIG. 5. Similarly, a result of the simulation of the variation of capacitance in accordance with the mass displacement in the vertical direction (Z direction), i.e., the gap distance between the movable member B1 and the surface of the substrate B5 is shown in FIG. 6.

From these diagrams, it is proved that the capacitance varies securely in accordance with each of the mass displacements in the horizontal direction and in the vertical direction. This is effective for generating power in accordance with a multi-axial vibration input. In addition, it is proved that a variation ratio of capacitance in accordance with the mass displacement is superior in the case using the PZT substrate to that in the case using the SiO$_2$ substrate. This indicates that usage of the ferroelectric substrate having large relative permittivity is effective.

(Fourth Section—Manufacturing Process)

Figure 7:
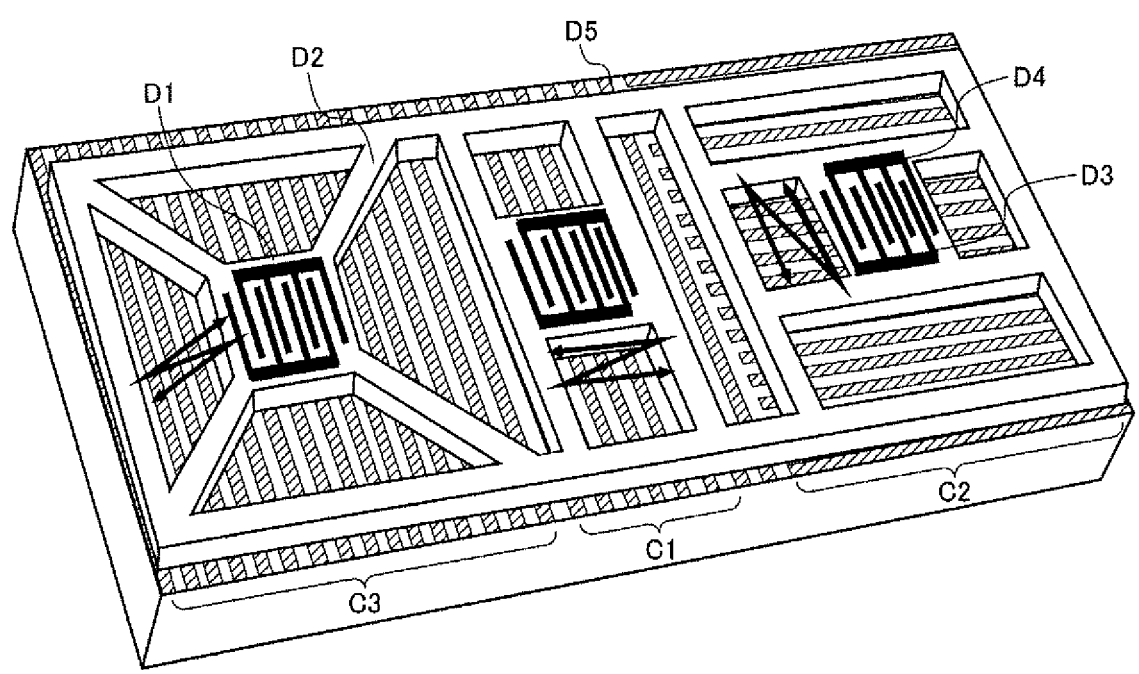
FIG. 7 is a schematic diagram illustrating a concept of a power generation apparatus that support all the X, Y and Z directions.

An outline of the MEMS power generation system is illustrated in FIG. 7. Note that the MEMS power generation system illustrated in FIG. 7 includes three power generation apparatuses C1, C2 and C3 for X, Y and Z directions, respectively. In addition, D1 denotes the proof mass (movable member), D2 denotes a beam portion, D3 denotes the electret, D4 denotes the opposing electrode, and D5 denotes the floating electrode in FIG. 7.

A manufacturing process for the power generation apparatus proposed here is designed for an actual power generation apparatus as illustrated in FIGS. 8A to 8F. In this section, the details thereof will be described as follows.

Figure 8A:
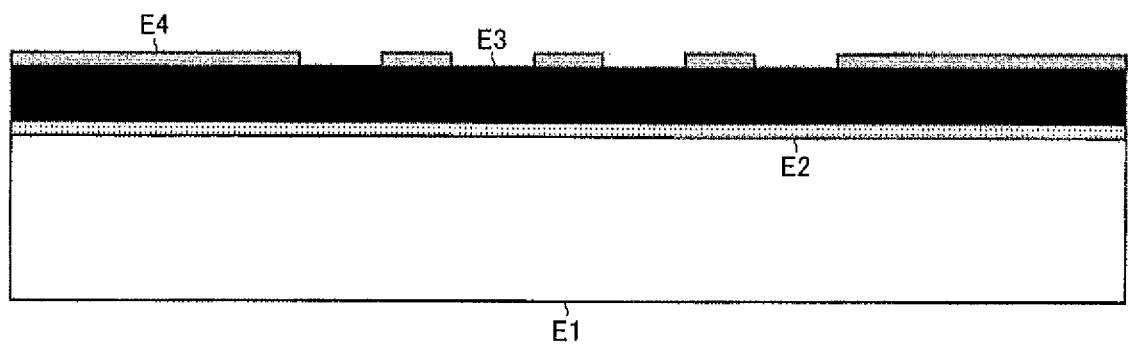
FIG. 8A is a cross sectional view illustrating a manufacturing process of the power generation apparatus (first state).

FIG. 8A illustrates a manner in which spattering of aluminum and patterning thereof are performed for forming the floating electrode.

First, a silicon wafer E1 (having a thickness of 500 µm) is prepared. A PZT plate E3 (10 mm square having a thickness of 100 µm, manufactured by Furuuchi Chemical Corporation, $\in_r=2,600$) with a polished surface is glued onto the silicon wafer E1. In this case, polydimethylsilozane (PDMS) is used as adhesive E2. After that, an aluminum E4 layer (having a thickness of 0.1 µm) is formed on the surface of the PZT plate E3 by spattering, and the comb teeth floating electrode is formed by patterning.

Figure 8B:
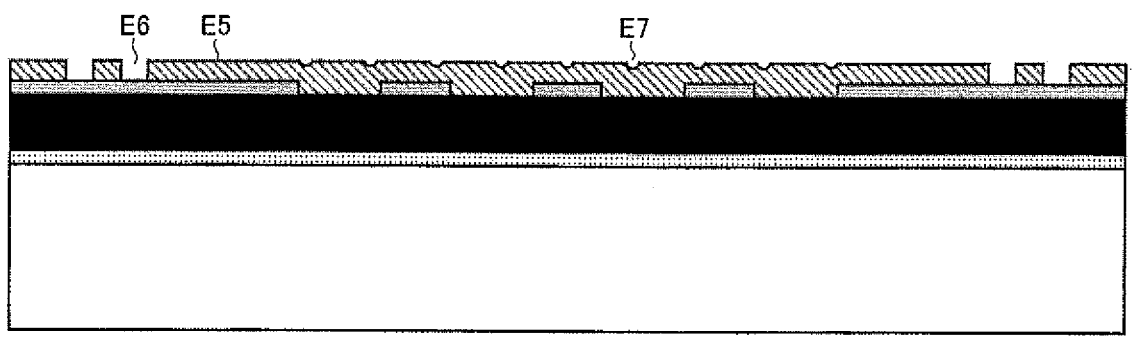
FIG. 8B is a cross sectional view illustrating the manufacturing process of the power generation apparatus (second state).

FIG. 8B illustrates a manner in which amorphous silicon is deposited by using a plasma-enhanced chemical vapor deposition (PECVD) method and further slots and dimples are formed in the amorphous silicon.

An amorphous silicon layer E5 (having a thickness of 1 μm) is deposited as a sacrificial layer by using the PECVD method. After that, etching process is performed for forming slots E6 and dimples E7 by using the $SF_6$ plasma. Note that a function of the amorphous silicon layer E5 will be described later.

Figure 8C:
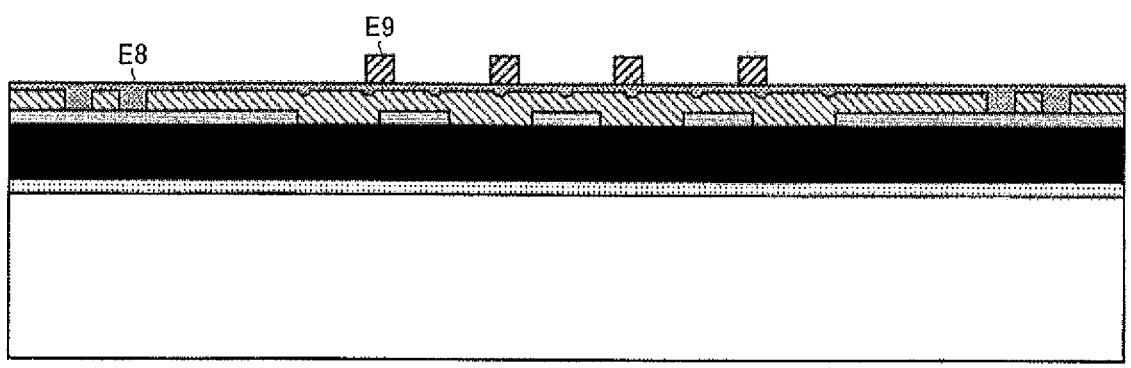
FIG. 8C is a cross sectional view illustrating the manufacturing process of the power generation apparatus (third state).

FIG. 8C illustrates a manner in which the parylene is deposited for protecting the injected electric charge, and then CYTOP is formed by spin coating, and further the CYTOP is etched by $O_2$ plasma.

A parylene layer E8 (having a thickness of 2 μm) is deposited by a CVD method for a purpose of protecting the injected electric charge in the electret from being discharged in the following process or even in a use in which the movable member collides with the substrate. Since the parylene layer E8 is deposited in an isometric manner, the slot E6 in the amorphous silicon layer E5 (see also FIG. 8B) is filled with the parylene E8. Thus, an anchor is formed so as to connect the movable member with the substrate. In view of mechanical strength of the connecting member for connecting the beam portion with the anchor portion and the mass portion, it is desirable that height of the parylene layer E8 is the same between the anchor portion and the mass portion. Therefore, the slot E6 is formed in the amorphous silicon layer E5, so that a contact area with anchor becomes a minimum area. In addition, the parylene E8 is also filled in the dimples E7 formed in the amorphous silicon layer E5 (see also FIG. 8B), so that bumps for preventing sticktion (sticking) are formed after the amorphous silicon layer E5 is removed.

The CYTOP film E9 (CTL-809 type manufactured by ASAHI GLASS CO., LTD.) is formed by spin coating on the surface of the parylene layer E8 and is dried at 120 degrees Celsius for 10 minutes. Note that a thickness of 0.3 μm can be obtained per one time of spin coating. This process is repeated 10 times, and a total thickness of 3 μm can be obtained. Then, it is dried at 180 degrees Celsius for an hour finally. The CYTOP film E9 is etched by $O_2$ plasma so that the comb teeth electret region is formed.

Figure 8D:
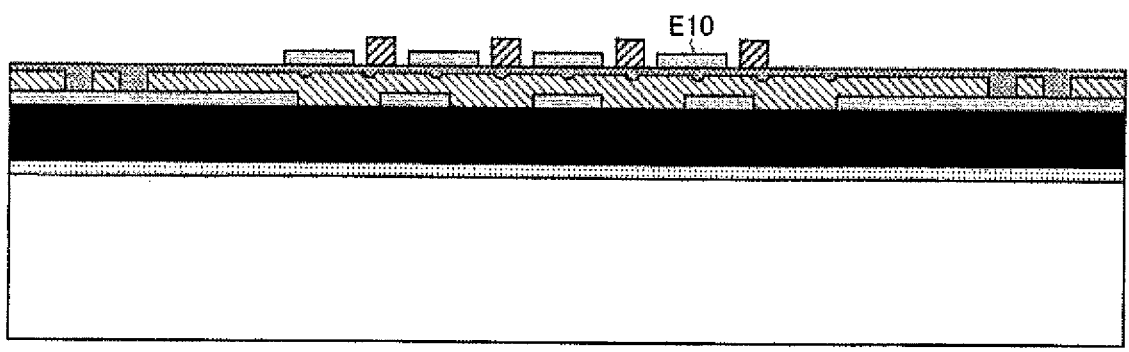
FIG. 8D is a cross sectional view illustrating the manufacturing process of the power generation apparatus (fourth state).

FIG. 8D illustrates a manner in which spattering and patterning of aluminum is performed so that the opposing electrode is formed. Note that the injection of electric charge into the CYTOP film by corona discharge (atmospheric discharge) is performed at this point of time.

An aluminum layer E10 (having a thickness of 0.5 μm) is formed by spattering and patterned so that the comb teeth opposing electrode is formed. After that, a predetermined amount of electric charge is injected into the completed CYTOP film E9 (see also FIG. 8C) by the corona discharge (atmospheric discharge) (details will be described later in Fifth section). Note that the assumed value of the surface voltage $V_{charge}$ is $-300$ V.

Figure 8E:
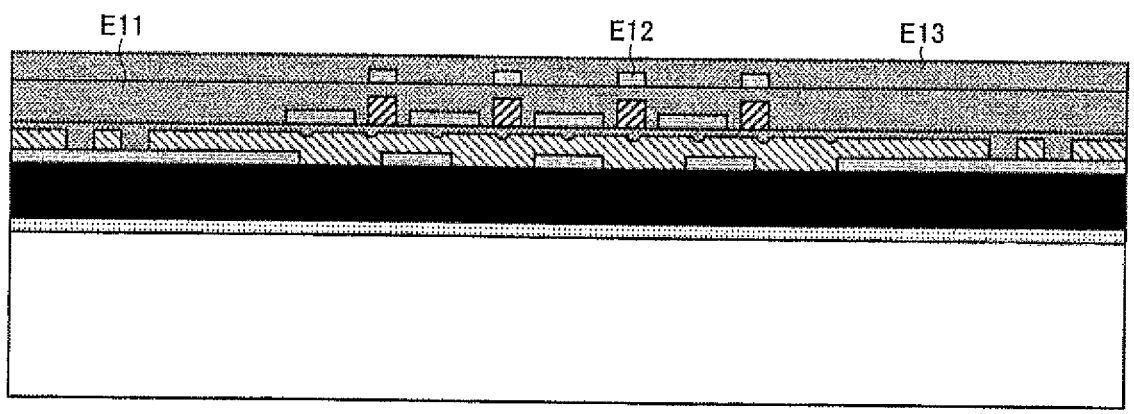
FIG. 8E is a cross sectional view illustrating the manufacturing process of the power generation apparatus (fifth state).

FIG. 8E illustrates a manner in which parylene is deposited and aluminum is spattered to make a base electrode on the parylene, and afterward parylene is further deposited.

A parylene layer E11 (having a thickness of 4 μm) is deposited for preventing discharge. An aluminum E12 (having a thickness of 0.5 μm) is spattered and patterned so that a substrate electrode of the comb teeth electret is formed. Then, a parylene layer E13 (having a thickness of 3 μm) is further deposited for preventing discharge.

Figure 8F:
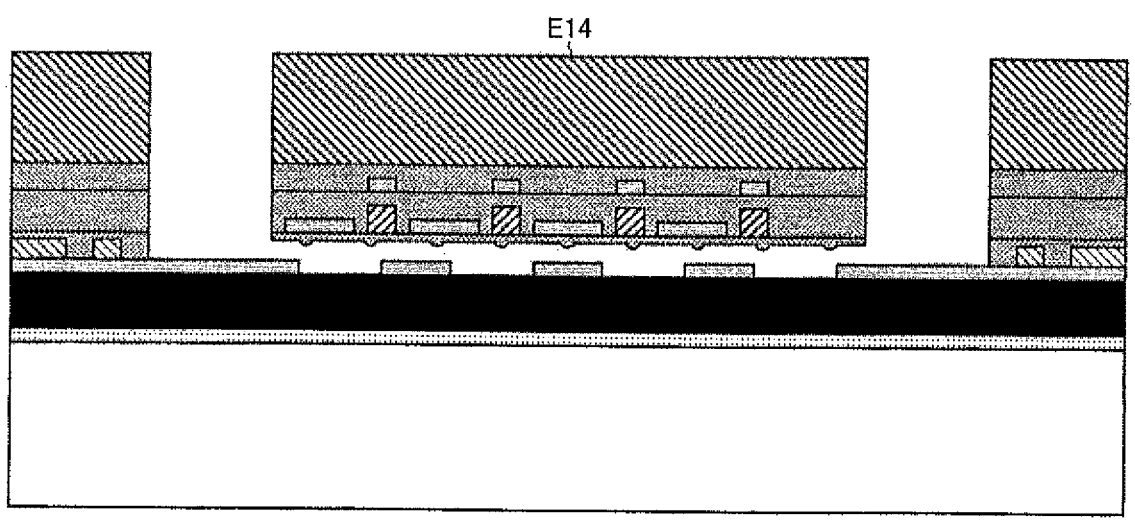
FIG. 8F is a cross sectional view illustrating the manufacturing process of the power generation apparatus (sixth state).

FIG. 8F illustrates a manner in which an SU-8 layer is formed by spin coating and patterning, and afterward the parylene is etched by $O_2$ plasma, and further the amorphous silicon is etched by $XeF_2$ so that the proof mass portion and the beam portion are separated from the dielectric substrate.

An SU-8 layer E14 (thick photoresist manufactured by KAYAKU MICROCHEM Corporation, KMPR-1035) is spin-coated and patterned so that the proof mass portion is formed. After that, the parylene layers E13, E11 and E8 (see also FIGS. 8E and 8B) are etched by $O_2$ plasma so that the supporting beam portion is formed. Finally, the sacrificial amorphous silicon E5 (see also FIG. 8B) is removed by using $XeF_2$ gas so that the mass portion and the beam portion are separated from the dielectric substrate. This dry etching process is effective for preventing sticktion. Note that it is necessary to design the material constituting the beam portion (spring portion) for supporting the proof mass portion to have a large aspect ratio (vertical/horizontal) so that the power generation is performed efficiently from movement of human body or the like (vibration at a few tens Hz). Therefore, as illustrated in FIG. 8F, the SU-8 layer E14 that can easily form a thick film is adopted as the material of the beam portion.

A part of these processes is carried out actually at present, and the optimal process condition is being searched by cut and try. Manufacturing and evaluation of an actual power generation apparatus will be studied in the future.

(Fifth Section—Electric Charge Injection Test)

This section will describe a preliminary experiment of injecting a predetermined amount of electric charge into the CYTOP film. As a matter of course, it is confirmed by other study that electric charge can be injected into the CYTOP film. Therefore, a result described here is a type of follow-up study by the inventor with facilities that are available to the inventor so as to confirm the charging ability.

First, a silicon wafer is prepared. A parylene layer (having a thickness of 2 μm) is deposited as an insulator for preventing discharge on a surface of the wafer. After that, a CYTOP film (having a thickness of 3 μm) is formed thereon (see Fourth section about details). The CYTOP film is etched by $O_2$ plasma so as to form a line and space pattern of 5 μm and 5 μm to be the comb teeth electret.

Figure 9:
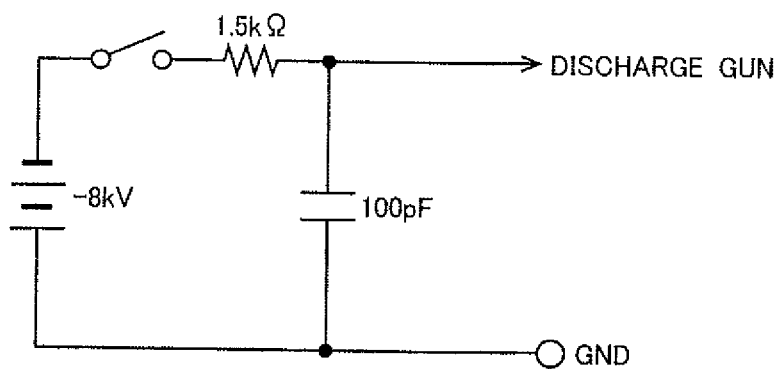
FIG. 9 is an equivalent circuit diagram of an electrostatic discharge simulator.

The predetermined amount of electric charge is injected into the CYTOP film processed by the corona discharge. For this purpose, an electrostatic discharge simulator (manufactured by NOISE LABORATORY CO., LTD, Type ESS-2002) is used. In this experiment, the output voltage from the discharge gun is set to $-8$ kV. An equivalent electric circuit is schematically illustrated in FIG. 9. In the experiment, two discharge models are used. One is an atmospheric discharge model (see FIG. 10A), and the other is a contact discharge model (see FIG. 10B). The discharge was performed total 600 times with an interval of 0.5 seconds between subsequent discharges. In the contact discharge, the switch was turned off during a discharge period so that the sample is kept in an insulated state.

Figure 10A:
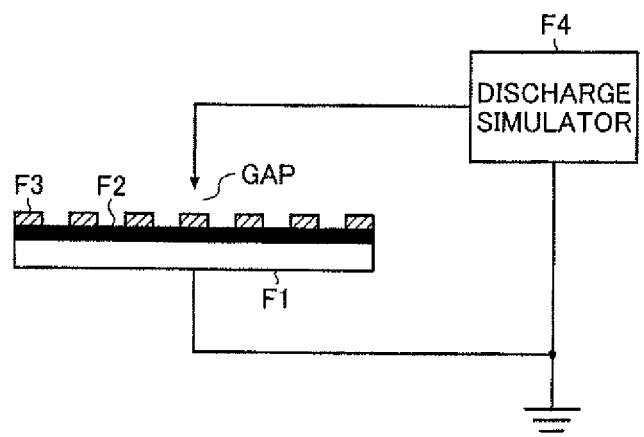
FIG. 10A is a diagram illustrating schematically a discharge condition of a CYTOP film (atmospheric discharge model)
Figure 10B:
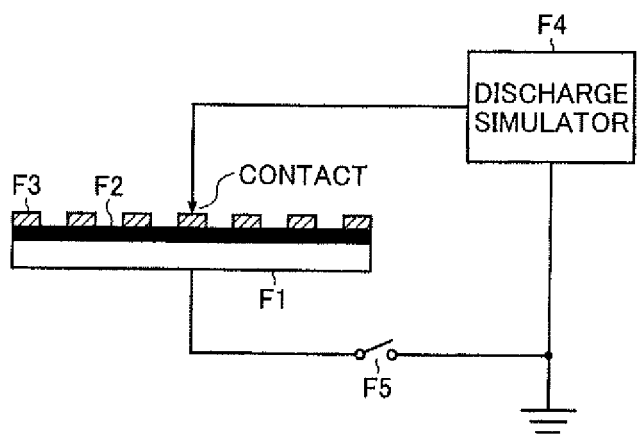
FIG. 10B is a diagram illustrating schematically a discharge condition of the CYTOP film (contact discharge model)

In FIGS. 10A and 10B, F1 denotes the silicon wafer, F2 denotes the parylene layer, F3 denotes the CYTOP film, F4 denotes the discharge simulator, and F5 denotes the switch.

After the discharging process described above, surface voltage of the CYTOP film was measured with an electrostatic sensor (manufactured by SUNX Limited, Type EF-S1). As a result, it was confirmed that approximately $-350$ V was obtained in the atmospheric discharge model while approximately $-250$ V was obtained in the contact discharge model. Using the electrostatic discharge simulator, charge injection into the CYTOP film can surely be performed, and it is proved that the atmospheric discharge model is more preferable than the contact discharge model in view of obtaining high surface voltage. However, other study has reported that higher surface voltage of approximately $-1,000$ V was obtained. It is a future task to study and catch up with the value by changing the experimental conditions of the discharge such as heating of the substrate during the discharge process.

(Sixth Section—Conclusion)

AS described above, this specification proposes the capacitive power generation apparatus that can use surface micromachining for a purpose of energy harvesting. The power generation apparatus has the structure in which the electret and the opposing electrode are arranged alternately and are formed on the same surface in the lower portion of the proof mass. The power generation apparatus utilizes the fringe electric field formed in the ferroelectric substrate having a large relative permittivity of 1,000 or larger.

For calculation of electric field or survey on variation of capacitance in accordance with mass variation, finite element method (FEM) simulation was performed. As a result, it was confirmed that the principle of operation proposed here was correct. The MEMS manufacturing process is designed for the power generation system constituted of three devices corresponding to multi-axial vibration (in the X axis direction, the Y axis direction, and the Z axis direction).

A general manufacturing method and evaluation of an actual power generation apparatus will be studied in the future. In particular, it is an important task to be investigated with high priority to confirm ability of the parylene film that is used as a protective layer for preventing discharge in the manufacturing process such as metal deposition or wet etching.

According to the energy harvesting with the power generation apparatus described above, inconvenience of worrying about battery life can be eliminated.

In addition, if the power generation apparatus described above is used as a power source for various sensors and wireless devices (e.g., a ZigBee 300 MHz band specific low-power wireless device), ubiquitous environment with a wireless sensor network can be established. In other words, a power supply wiring for various sensors and wireless devices becomes needless, so that information connection in a network can be realize by disposing the devices in a distributed manner.

Further, as a scene in which the ubiquitous environment using the power generation apparatus described above is used, there are medical and health field (health care and safety check), monitoring of a structure (monitoring a state of wiring or fastening bolts), monitoring of a plant (monitoring an abnormal state of facility), physical distribution management (monitoring a distribution state and quality), and the like.

Note that surface micromachining can be applied to the power generation apparatus proposed in this specification, so that manufacturing cost can be reduced.

In addition, a gap distance between the substrate and the proof mass (movable member) can be reduced in the power generation apparatus proposed in this specification, so that a smaller size and higher efficiency than the conventional structure can be realized.

In addition, according to the power generation apparatus proposed in this specification, the fringe electric field and the ferroelectric can be used so that the equivalent variation of the relative permittivity can be utilized for the power generation action. Therefore, power generation efficiency (detection sensitivity of vibration) can be improved largely compared with the conventional structure (in which a variation of overlapping area between the electret and the opposing electrode is utilized for the power generation action).

In addition, according to the power generation apparatus proposed in this specification, not only the vibration in the horizontal direction but also the vibration in the vertical direction can be used for the power generation action. Therefore, power generation efficiency can further be improved.

In addition, the above description mentions two types of methods of injecting electric charge into the electret, which are the corona discharge (atmospheric discharge) and the contact discharge. According to the power generation apparatus proposed in this specification, a terminal of exposed electret material (hereinafter referred to as an electret terminal) is led out externally, so that electric charge can be injected into the electret by the contact discharge in the final stage of the manufacturing process. Therefore, a large scale of corona discharge facility is needless so that manufacturing cost can be reduced. Further, another merit is that there is no worry about discharge during the manufacturing process. In addition, it is possible to insert a discharge probe via a through hole formed in the movable member for injecting electric charge into the CYTOP just before etching the sacrificial layer as the final step. Therefore, surface micromachining can be used unlike the conventional method in which the substrates are glued to each other. In addition, it is possible to eliminate misalignment between the comb teeth electrodes (electret and opposing electrode) in the lower portion of the movable member and the floating electrode in the upper portion of the dielectric.

As described above, according to the power generation apparatus proposed in this specification, it is possible to realize high output of 100 times and low cost of ½ compared with the conventional power generation apparatus.

Hereinafter, embodiments of the present invention will be described with reference to the attached drawings.

First Embodiment

Figure 11:
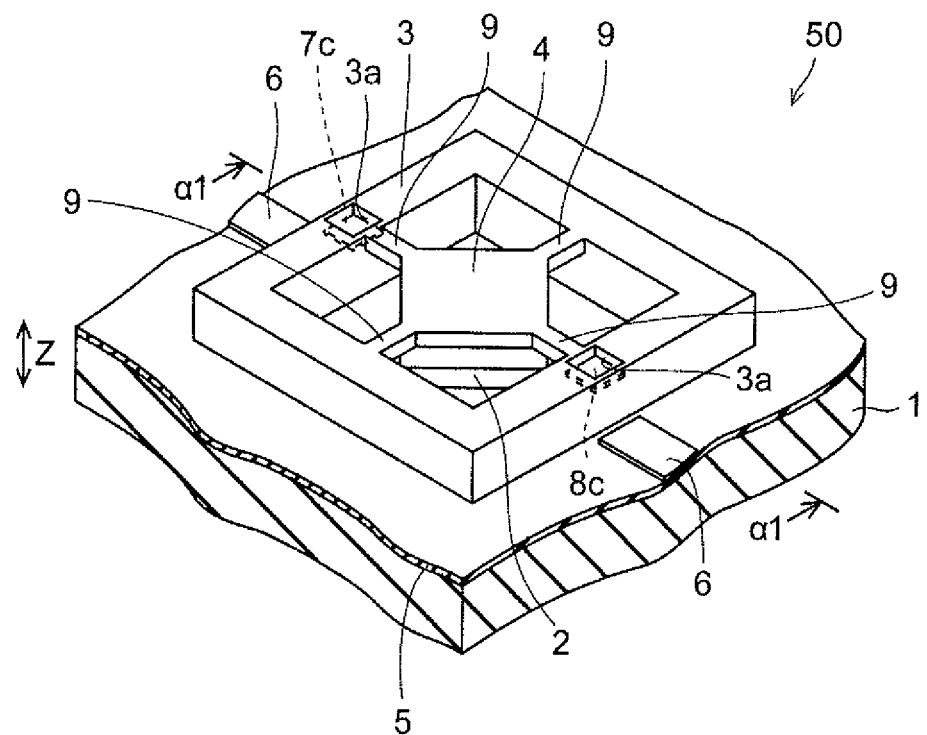
FIG. 11 is a perspective view illustrating a structure of the power generation apparatus according to the first embodiment of the present invention.
Figure 12:
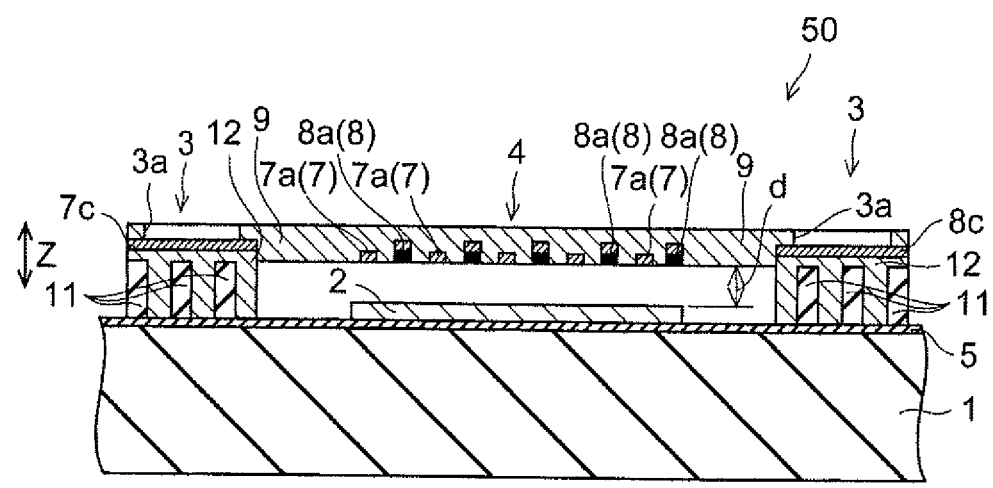
FIG. 12 is a cross sectional view cut along the line α1-α1 in FIG. 11.
Figure 13:
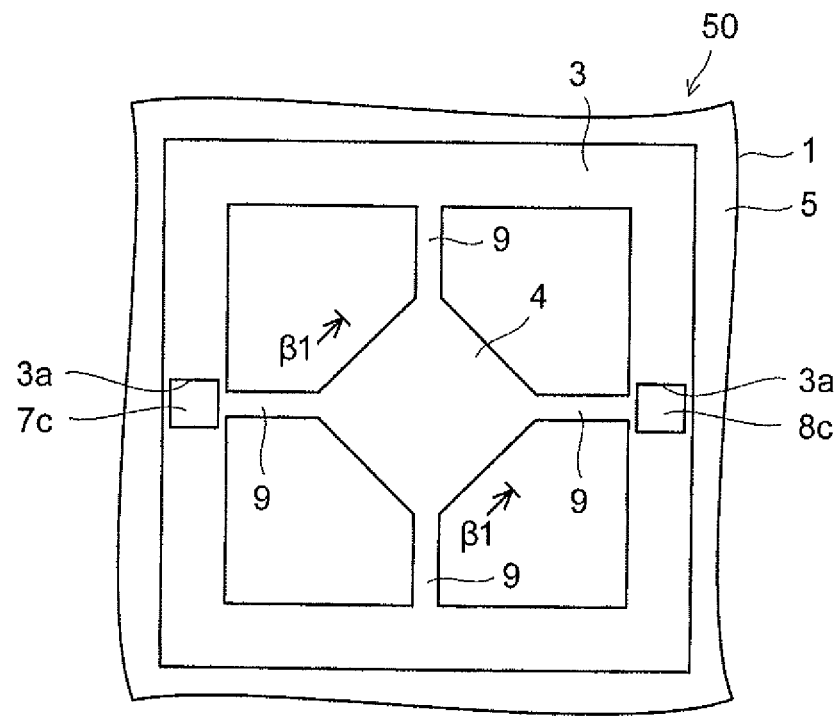
FIG. 13 is a plan view of the power generation apparatus according to the first embodiment of the present invention.

FIG. 11 is a perspective view of a structure of a power generation apparatus according to a first embodiment of the present invention. FIG. 12 is a cross sectional view cut along the line α1-α1 in FIG. 11. FIG. 13 is a plan view of the power generation apparatus according to the first embodiment of the present invention illustrated in FIG. 11. FIGS. 14 to 17 are diagrams for illustrating the structure of the power generation apparatus according to the first embodiment of the present invention. First, with reference to FIGS. 11 to 17, the structure of the power generation apparatus 50 according to the first embodiment of the present invention will be described.

The power generation apparatus 50 according to the first embodiment includes a ceramic substrate 1, a ferroelectric layer 2 formed on the ceramic substrate 1, a frame portion 3 formed on the ceramic substrate 1 so as to surround the ferroelectric layer 2, and a proof mass 4 disposed inside the frame portion 3 as illustrated in FIG. 11. Note that the ferroelectric layer 2 is an example of the "dielectric layer" in the present invention, and the proof mass 4 is an example of the "movable member" in the present invention.

The ceramic substrate 1 is made of $Al_2O_3$ and has a thickness of approximately 1 mm. A glaze layer 5 is formed on the upper surface of the ceramic substrate 1. Note that the glaze layer 5 is formed for obtaining a smooth surface that is suitable for forming the ferroelectric layer 2 and the like thereon. In addition, a wiring layer 6 is formed on the upper surface of the ceramic substrate 1 (glaze layer 5) in a predetermined region outside the frame portion 3 by a screen printing method. The wiring layer 6 is made of Au (gold), for example.

Figure 14:
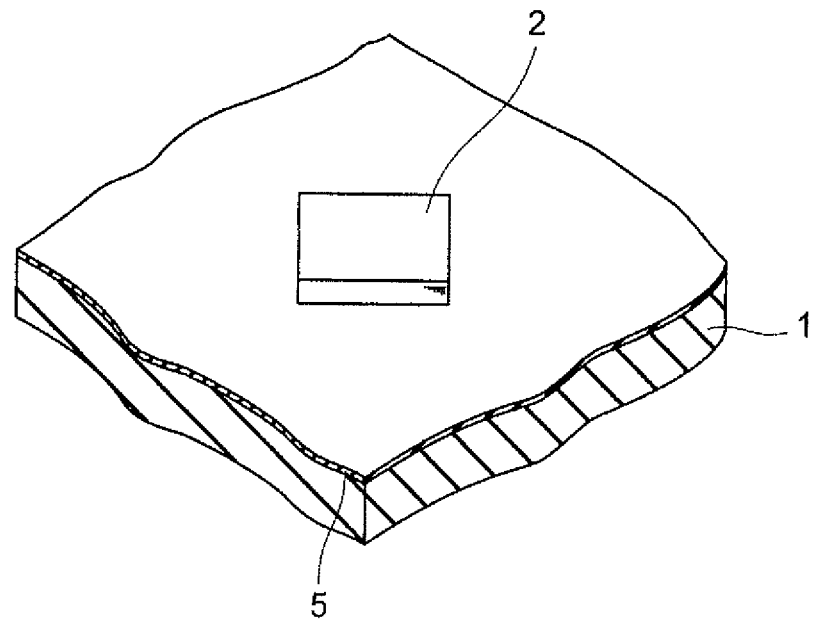
FIG. 14 is a perspective view illustrating a structure of a ferroelectric layer of the power generation apparatus according to the first embodiment of the present invention.

Here, the ferroelectric layer 2 of the first embodiment is made of $BaTiO_3$ (having a relative permittivity of 1,000 or larger). In addition, the ferroelectric layer 2 is formed on the ceramic substrate 1 (glaze layer 5) in a predetermined region by a screen printing method as illustrated in FIGS. 12 and 14. The ferroelectric layer 2 has substantially a rectangular shape in a plan view.

In addition, in the first embodiment, the ferroelectric layer 2 is formed to have a thickness of 5 μm or larger. Specifically, the ferroelectric layer 2 is formed to have a thickness t1 of 5 to 20 μm (see FIG. 16).

Figure 16:
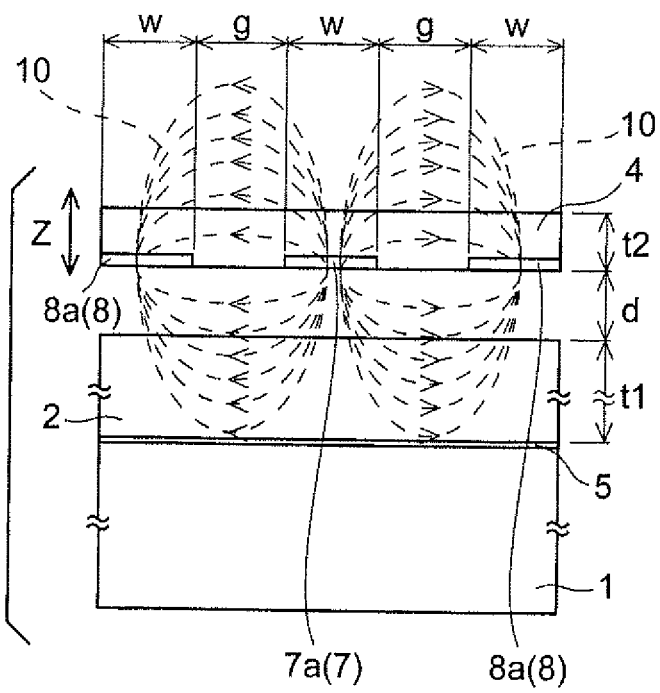
FIG. 16 is a cross sectional view cut along the line β1-β1 in FIG. 13.

In addition, the proof mass 4 is made of parylene (a resin of paraxylene system) and is formed to have a thickness t2 of approximately 5 μm (see FIG. 16) as illustrated in FIGS. 12 and 16. In addition, the proof mass 4 is formed to have substantially a rectangular shape (with a side length of approximately 1000 μm) in a plan view as illustrated in FIG. 13.

Figure 15:
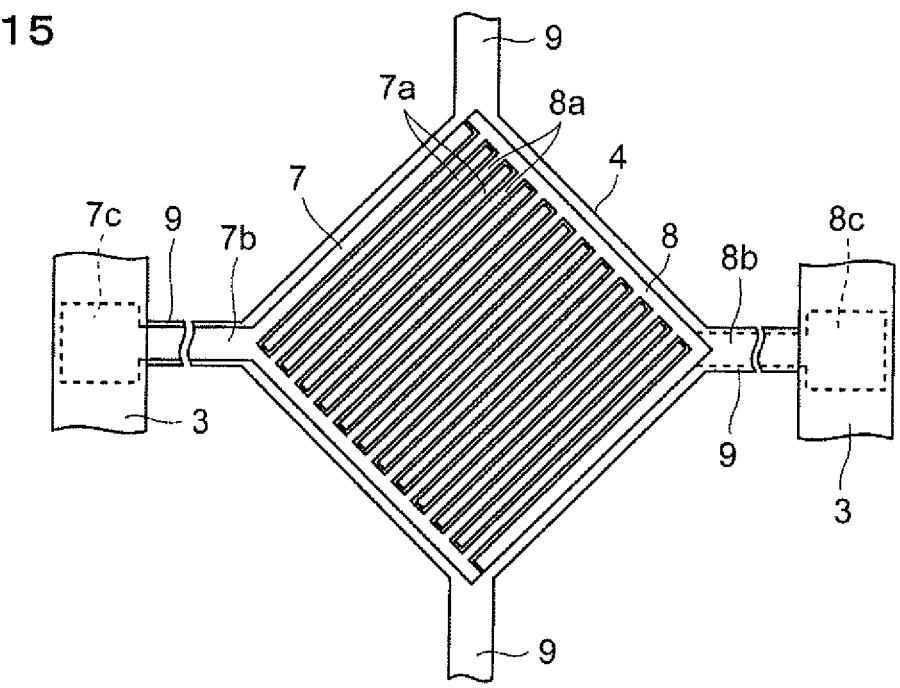
FIG. 15 is a plan view of a proof mass of the power generation apparatus according to the first embodiment of the present invention, which is viewed from the bottom side.
Figure 17:
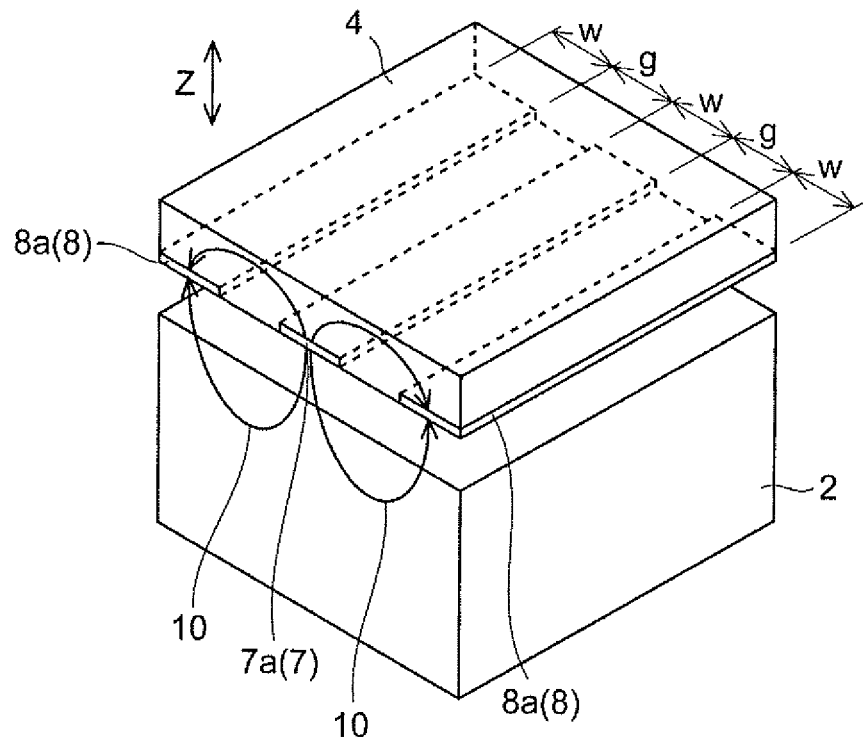
FIG. 17 is a perspective view illustrating a part of the power generation apparatus according to the first embodiment of the present invention.

Here, in the first embodiment, as illustrated in FIG. 15, two electrodes (first electrode 7 and second electrode 8) are formed on the back side (under surface side) of the proof mass 4 so as to be adjacent to each other in the same plane. Specifically, each of the first electrode 7 and the second electrode 8 is formed like a comb teeth in a plan view. In addition, comb teeth portions 7a of the first electrode 7 and comb teeth portions 8a of the second electrode 8 are arranged alternately. Further, as illustrated in FIGS. 16 and 17, a width w of the comb teeth portion 7a of the first electrode 7 and a width w of the comb teeth portion 8a of the second electrode 8 are approximately 5 μm each. In addition, a length g from the comb teeth portion 7a of the first electrode 7 to a neighboring comb teeth portion 8a of the second electrode 8 is also approximately 5 μm. Note that the first electrode 7 and the second electrode 8 are formed in substantially the entire surface of the back side (under surface side) of the proof mass 4 in the power generation apparatus 50 according to the first embodiment as illustrated in FIG. 15.

The first electrode 7 described above corresponds to the opposing electrode and is made of metal material such as aluminum (see B4 in FIGS. 3A to 3C and 4, and E10 in FIG. 8D). In addition, the second electrode 8 described above has a lamination structure of an electret portion (CYTOP film or the like) for holding a predetermined amount of electric charge semipermanently and a base electrode portion (aluminum or the like) for setting a potential reference in the power generation (see B2 and B3 in FIGS. 3A to 3C and 4, E9 in FIG. 8C, and E12 in FIG. 8E).

In addition, the proof mass 4 includes four beam portions 9 that are connected integrally to the proof mass 4 as illustrated in FIGS. 11 and 13. The four beam portions 9 are respectively disposed at four corner portions of the proof mass 4, so as to extend outward radially in a plan view. In addition, end portions of the four beam portions 9 are connected to the frame portion 3 integrally. Thus, the proof mass 4 is supported above the ferroelectric layer 2 so as to be opposed to the ferroelectric layer 2 as illustrated in FIGS. 11 and 12. Note that a distance d between the upper surface of the ferroelectric layer 2 and the proof mass 4 (the first electrode 7 and the second electrode 8) is approximately 1 μm (see FIGS. 12 and 16).

In addition, each of the four beam portions 9 has a thickness of approximately 5 μm and a width of approximately 50 μm. In other words, a length in the width direction of the beam portion 9 is larger than a length in the thickness direction of the same so that the beam portion 9 can easily be deformed elastically in the vertical direction (in the direction of the arrow Z) with reference to the upper surface of the ceramic substrate 1. Thus, when an acceleration is applied to the proof mass 4 supported by the four beam portions 9, the proof mass 4 can be moved by its inertial force in the vertical direction (in the direction of the arrow Z) with respect to the upper surface of the ceramic substrate 1.

In addition, the first electrode 7 is connected electrically to a pad electrode 7c via a connecting portion 7b as illustrated in FIG. 15. On the other hand, the electret portion of the second electrode 8 for holding a predetermined amount of electric charge semipermanently is in an electrically insulated state, while the base electrode portion of the same for setting the potential reference in the power generation is electrically connected to a pad electrode 8c via a connecting portion 8b. Note that the pad electrode 7c is an electrode for outputting current obtained by the power generation and is connected to a load to which the current is supplied when the power generation apparatus 50 is used. On the other hand, the pad electrode 8c is an electrode for setting the potential reference in the power generation and is connected to a predetermined reference potential when the power generation apparatus 50 is used. In addition, although not illustrated clearly in this diagram, the power generation apparatus 50 of this embodiment is equipped with an electret terminal for injecting a predetermined amount of electric charge into the electret portion of the second electrode 8 by contact discharge in the manufacturing process (final stage) of the power generation apparatus 50. Note that the electret terminal is connected to a predetermined contact discharge apparatus (high voltage applying apparatus) when the charge injection is performed, and is opened or connected to the ground when the power generation apparatus 50 is used.

In addition, the frame portion 3 has a thickness larger than that of the proof mass 4 as illustrated in FIG. 12, and has a function of supporting the proof mass 4 via the beam portions 9 as illustrated in FIGS. 11 to 13. Note that the frame portion 3 is made mainly of parylene. In addition, opening portions 3a are formed in predetermined regions of the frame portion 3 so as to expose surfaces of the pad electrodes 7c and 8c.

Figure 18:
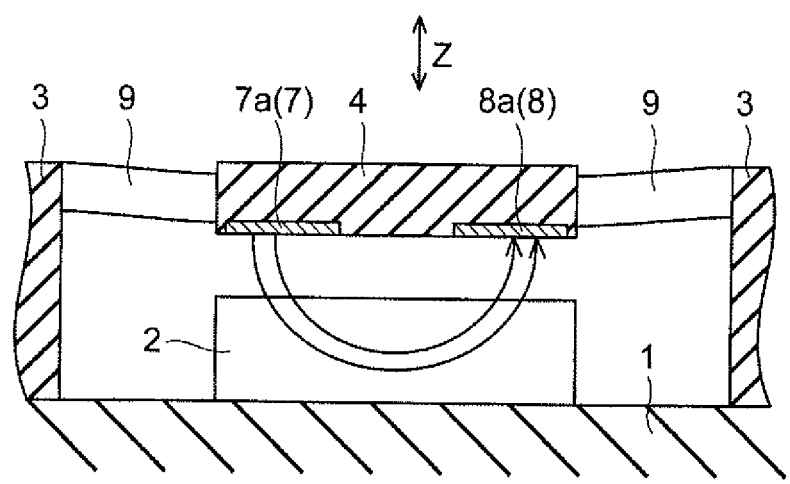
FIG. 18 is a schematic cross sectional view for illustrating an operation of the power generation apparatus according to the first embodiment of the present invention.

FIG. 18 is a schematic cross sectional view for illustrating an operation of the power generation apparatus according to the first embodiment of the present invention. Next, with reference to FIGS. 15 to 18, an operation of the power generation apparatus 50 according to the first embodiment of the present invention will be described.

In the power generation apparatus 50 according to the first embodiment, a fringe electric field 10 (electric field generated beside a part between electrodes) is generated between the comb teeth portion 7a of the first electrode 7 and the comb teeth portion 8a of the second electrode 8 as illustrated in FIGS. 16 and 17. Here, the first electrode 7 and the second electrode 8 that generate the fringe electric field 10 are formed in comb teeth shapes, and the comb teeth portions 7a and 8a of them are arranged alternately as illustrated in FIG. 15. Therefore, the fringe electric field 10 is generated uniformly in substantially the entire surface of the back side (under surface side) of the proof mass 4. On the other hand, as illustrated in FIGS. 16 to 18, the ferroelectric layer 2 that is opposed to the proof mass 4 is disposed in the generated fringe electric field 10.

If a vibration in the vertical direction (Z direction) is applied to the power generation apparatus 50 in this state, the proof mass 4 is moved in the direction of the arrow Z as illustrated in FIG. 18 because of the inertial force that acts on the proof mass 4. Therefore, a volume ratio of the ferroelectric layer 2 in the fringe electric field 10 varies, so that a capacitance value of a capacitor formed between two electrodes varies. Along with the above-mentioned variation of capacitance, a predetermined amount of electric charge is induced in the first electrode 7 (opposing electrode) and is output as electric current.

Next, a result of a computer simulation for confirming the effect of the power generation apparatus 50 according to the first embodiment will be described. In the computer simulation, a cover ratio was determined in the case where a thickness t1 of the ferroelectric layer 2 was varied variously.

Figure 19:
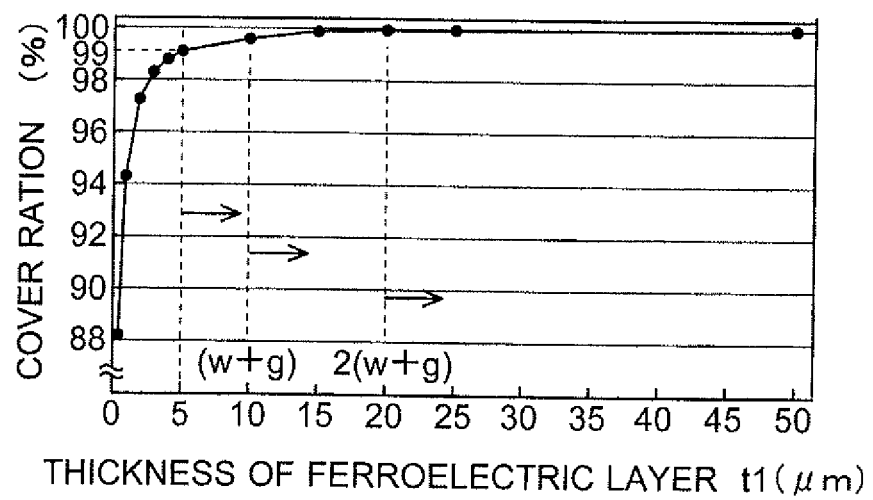
FIG. 19 is a graph illustrating a relationship between a thickness of the ferroelectric layer and a cover ratio.

FIG. 19 is a graph showing a relationship between a thickness of the ferroelectric layer 2 and the cover ratio. In FIG. 19, the vertical axis represents the cover ratio (%) while the horizontal axis represents a thickness t1 (μm) of the ferroelectric layer 2. In other words, FIG. 19 shows a variation of the cover ratio in the case where a thickness t1 of the ferroelectric layer 2 is varied variously in the structure of the power generation apparatus 50 according to the first embodiment. Here, the cover ratio is expressed by the following equation (4).

$$\text{Cover ratio (\%)} = \frac{(X1 - X2)}{X1} \times 100 \tag{4}$$

In the equation (4), X1 denotes the number of electric flux lines of the fringe electric field 10 that penetrate into the region of the ferroelectric layer 2, X2 denotes the number of electric flux lines that cannot turn in the region of the ferroelectric layer 2 and go out from the lower portion of the region of the ferroelectric layer 2.

In other words, the cover ratio is a value indicating the ratio of the electric flux lines turns in the region of the ferroelectric layer 2 to the electric flux lines penetrating into the ferroelectric layer 2. The higher this value, the larger the variation of capacitance value corresponding to the displacement of the proof mass 4 becomes. Note that the voltages to be applied to the electrodes were set to 0 V (the first electrode 7 or the second electrode 8) and 5 V (the second electrode 8 or the first electrode 7).

As illustrated in FIG. 19, it was found that 99% or higher cover ratio can be obtained by setting the thickness t1 of the ferroelectric layer 2 to 5 μm or larger. In addition, it was found that substantially 100% (99.8% or higher) cover ratio can be obtained by setting the thickness t1 of the ferroelectric layer 2 to 10 μm or larger, and 100% cover ratio can be obtained by setting the same to 20 μm or larger. Note that if the thickness t1 of the ferroelectric layer 2 is 10 μm, the thickness t1 of the ferroelectric layer 2 agrees with the sum length (w+g, approximately 10 μm) of the width w (approximately 5 μm) of the comb teeth portion 7a (or 8a) of the first electrode 7 or the second electrode 8 and the length g (approximately 5 μm) from the comb teeth portions 7a of the first electrode 7 to a neighboring comb teeth portion 8a of the second electrode 8. In addition, if the thickness t1 of the ferroelectric layer 2 is 20 μm, the thickness t1 of the ferroelectric layer 2 is equal to twice (2(w+g)) of the above-mentioned sum length (w+g, approximately 10 μm).

As described above, it was confirmed that a sufficient value of the cover ratio can be obtained by setting the thickness t1 of the ferroelectric layer 2 to 5 μm or larger, so that the variation of capacitance value corresponding to the displacement of the proof mass 4 can be sufficiently large. Thus, it was confirmed that the power generation capacity can be improved.

In the first embodiment, as described above, the first electrode 7 and the second electrode 8 are formed on the ferroelectric layer 2 side of the proof mass 4, so that the fringe electric field 10 can be generated between the first electrode 7 and the second electrode 8. In addition, the ferroelectric layer 2 made of BaTiO$_3$ is formed in the predetermined region on the ceramic substrate 1, so that the relative permittivity of the ferroelectric layer 2 can be increased sufficiently, because BaTiO$_3$ is a metal oxide (ferroelectric substance) having a relative permittivity of 1,000 or larger. Therefore, the variation of capacitance value due to the variation of the volume ratio of the ferroelectric layer 2 in the fringe electric field 10 can be increase, so that the vibration applied to the power generation apparatus 50 can be converted into electric current with high efficiency.

In addition, in the first embodiment, the ferroelectric layer 2 is made of BaTiO$_3$. Therefore, even if the distance d between the ferroelectric layer 2 and the proof mass 4 is increased, decrease of the variation of capacitance value can be suppressed. Thus, by increasing the distance d between the ferroelectric layer 2 and the proof mass 4, occurrence of sticktion can be suppressed. In this way, decrease of reliability due to occurrence of sticktion can be suppressed. Note that BaTiO$_3$ is a ferroelectric substance containing no lead (Pb), so that an environment load due to waste can be reduced, and a bad influence to a human body can be reduced by using the ferroelectric layer 2 made of BaTiO$_3$.

In addition, in the first embodiment, the ceramic substrate 1 made of Al$_2$O$_3$ is used as the substrate, so that insulating performance and mechanical strength can be improved compared with the case where a silicon substrate or the like is used as the substrate. Thus, manufacturing efficiency can be improved while the power generation capacity can be improved, and reliability can also be improved. In addition, by using the ceramic substrate 1 is used as the substrate, manufacturing cost can be reduced compared with the case where a silicon substrate is used. Further, the MEMS power generation apparatus can be formed directly on the ceramic package as a final product.

In addition, in the first embodiment, 99% or higher cover ratio can be obtained by setting the thickness t1 of the ferroelectric layer 2 to 5 μm or larger, so that the variation of capacitance value can be increased. Thus, manufacturing efficiency can be improved while power generation capacity can further be improved easily. Note that the thickness t1 of the ferroelectric layer 2 is preferably set to 10 μm or larger, and more preferably set to 20 μm or larger.

In addition, in the first embodiment, smoothness of the upper surface of the ferroelectric layer 2 can be improved by forming the glaze layer 5 between the ceramic substrate 1 and the ferroelectric layer 2. Therefore, unevenness of approximately 0.1 to 0.2 μm can be formed on the upper surface of the ferroelectric layer 2 by controlling a grain size of BaTiO$_3$.

FIGS. 20 to 28 are diagrams for illustrating a manufacturing method of the power generation apparatus according to the first embodiment of the present invention. Next, with reference to FIGS. 11, 15, 16 and 20 to 28, a manufacturing method of the power generation apparatus 50 according to the first embodiment of the present invention will be described. Note that the power generation apparatus 50 according to the first embodiment is manufactured by using mainly surface micromachining technology.

Figure 20:
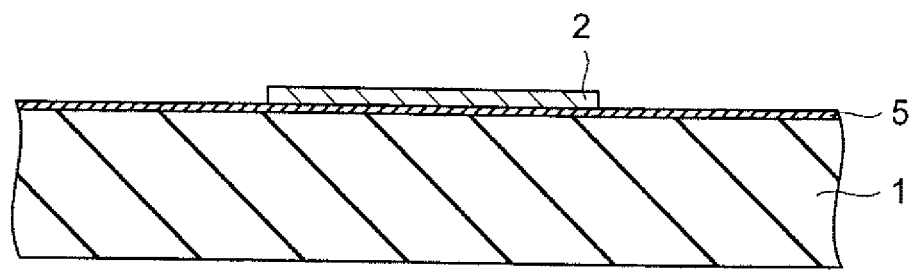
FIG. 20 is a cross sectional view for illustrating a manufacturing method of the power generation apparatus according to the first embodiment of the present invention.

First, as illustrated in FIG. 20, the glaze layer 5 is formed on the upper surface of the ceramic substrate 1 made of Al$_2$O$_3$ having a thickness of approximately 1 mm. The glaze layer 5 is formed, for example, by printing liquid containing a glass component on the ceramic substrate 1 and afterward baking at a predetermined temperature.

Next, by using a screen printing method, the wiring layer 6 illustrated in FIG. 11 is formed on the glaze layer 5. After that, as illustrated in FIG. 20, the ferroelectric layer 2 is formed in a predetermined region on the ceramic substrate 1 (glaze layer 5).

Here, in the first embodiment, the ferroelectric layer 2 is formed by using a screen printing method. Specifically, paste containing BaTiO$_3$ is printed in the predetermined region on the glaze layer 5, and afterward it is baked at a baking temperature of approximately 800 to 1200 degrees Celsius, so that the ferroelectric layer 2 made of $BaTiO_3$ is formed.

In addition, in the first embodiment, the ferroelectric layer 2 is formed so that a thickness t1 (see FIG. 16) becomes 5 to 20 μm, and is formed so that unevenness of approximately 0.1 to 0.2 μm (not shown) is generated on the upper surface of the ferroelectric layer 2 by controlling a grain size of $BaTiO_3$.

Figure 21:
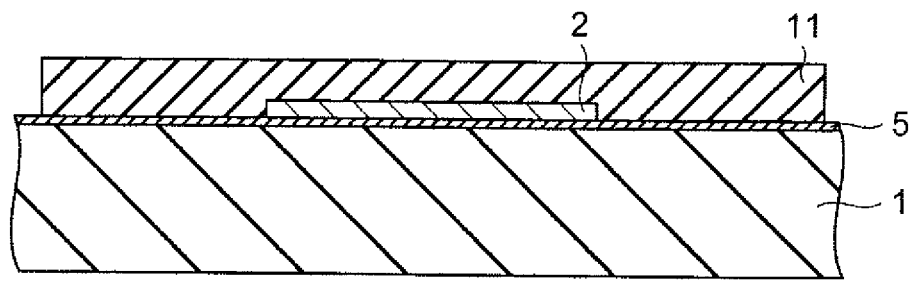
FIG. 21 is a cross sectional view for illustrating the manufacturing method of the power generation apparatus according to the first embodiment of the present invention.

Next, as illustrated in FIG. 21, using a plasma CVD method, a sacrificial layer 11 made of amorphous silicon is formed on the glaze layer 5 so as to cover the ferroelectric layer 2. Here, the sacrificial layer 11 is a layer that is formed on the precondition that it is removed in a later step.

Figure 22:
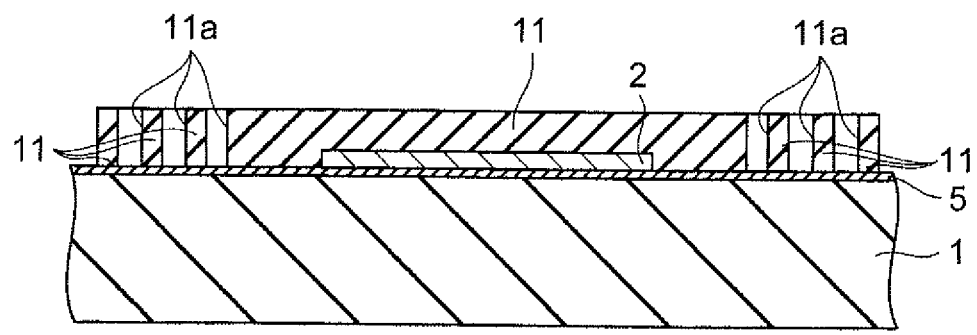
FIG. 22 is a cross sectional view for illustrating a manufacturing method of the power generation apparatus according to the first embodiment of the present invention.
Figure 23:
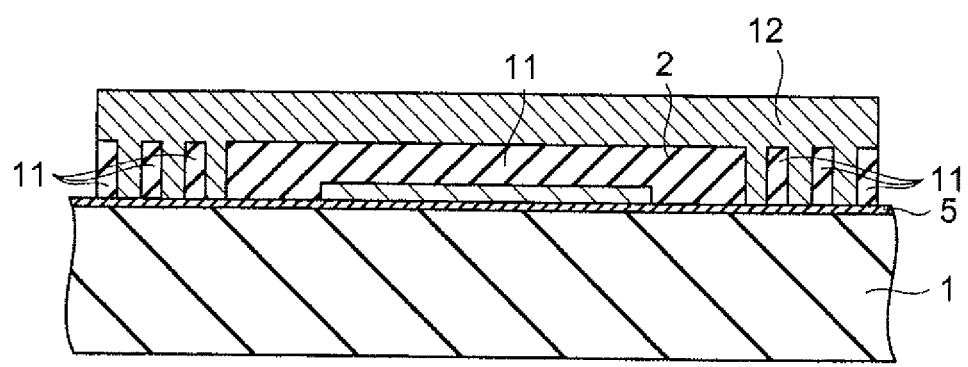
FIG. 23 is a cross sectional view for illustrating a manufacturing method of the power generation apparatus according to the first embodiment of the present invention.

Next, as illustrated in FIG. 22, by a photolithography technique and a dry etching technique using $SF_6$ plasma gas, elongated trench portions (slots) 11a are formed in the sacrificial layer 11. After that, as illustrated in FIG. 23, a first parylene layer 12 is formed by vapor deposition on the upper surface of the sacrificial layer 11. In this case, the first parylene layer 12 formed in the trench portion 11a becomes the anchor portion for supporting the proof mass 4.

Figure 24:
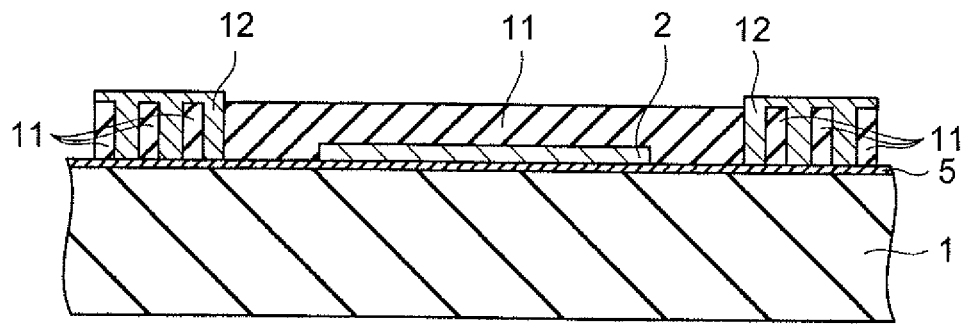
FIG. 24 is a cross sectional view for illustrating a manufacturing method of the power generation apparatus according to the first embodiment of the present invention.

Next, as illustrated in FIG. 24, by a photolithography technique and an etching technique using $O_2$ plasma gas, a predetermined region of the first parylene layer 12 is removed.

Figure 25:
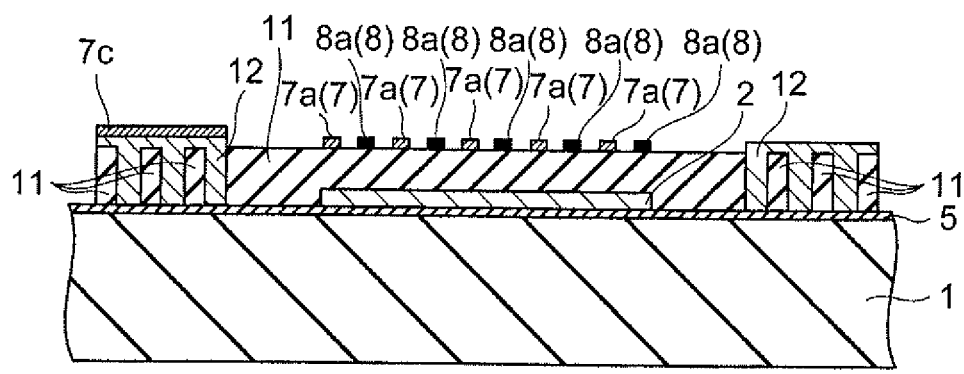
FIG. 25 is a cross sectional view for illustrating a manufacturing method of the power generation apparatus according to the first embodiment of the present invention.

After that, an aluminum layer is formed on the sacrificial layer 11 and the first parylene layer 12 by a sputtering method or a vapor deposition method. Then, as illustrated in FIG. 25, the formed aluminum layer is patterned by using a photolithography technique and a wet etching technique. Thus, the first electrode 7 having a comb teeth shape illustrated in FIG. 15 is formed, and the pad electrode 7c that is electrically connected to the first electrode 7 is formed. Further, the connecting portion 7b (see FIG. 15) for connecting the first electrode 7 to the pad electrode 7c is also formed by patterning the above-mentioned aluminum layer simultaneously.

In addition, a CYTOP film is formed by spin coating on the sacrificial layer 11, and afterward the CYTOP film is etched by $O_2$ plasma. By this process, the electret portion of the second electrode 8 is formed in a comb teeth shape.

After that, a parylene layer for preventing discharge (see E11 in FIG. 8E about details although omitted in FIGS. 25 and 26) is formed on the sacrificial layer 11 and the first parylene layer 12 so as to cover the first electrode 7, the electret portion of the second electrode 8, the pad electrode 7c, and the connecting portion 7b (see FIG. 15). In addition, an aluminum layer is formed by sputtering as the base electrode portion of the second electrode 8 and the pad electrode 8c to be connected to the second electrode 8 on the same. Note that the connecting portion 8b (see FIG. 15) for connecting the base electrode portion of the second electrode 8 to the pad electrode 8c is also formed by patterning the above-mentioned aluminum layer simultaneously.

Figure 26:
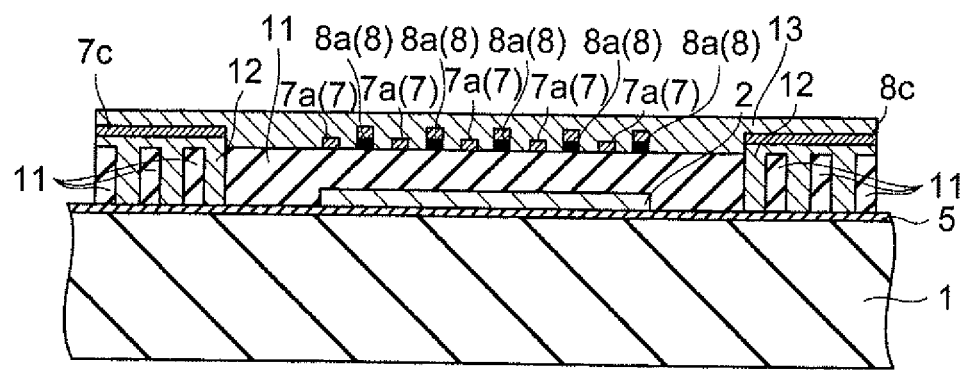
FIG. 26 is a cross sectional view for illustrating a manufacturing method of the power generation apparatus according to the first embodiment of the present invention.
Figure 27:
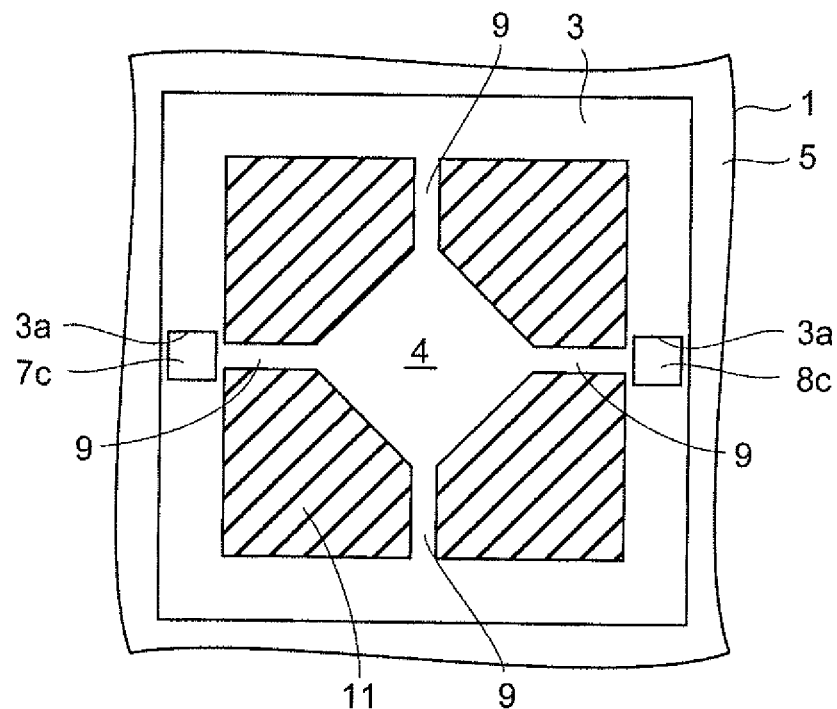
FIG. 27 is a plan view for illustrating a manufacturing method of the power generation apparatus according to the first embodiment of the present invention.
Figure 28:
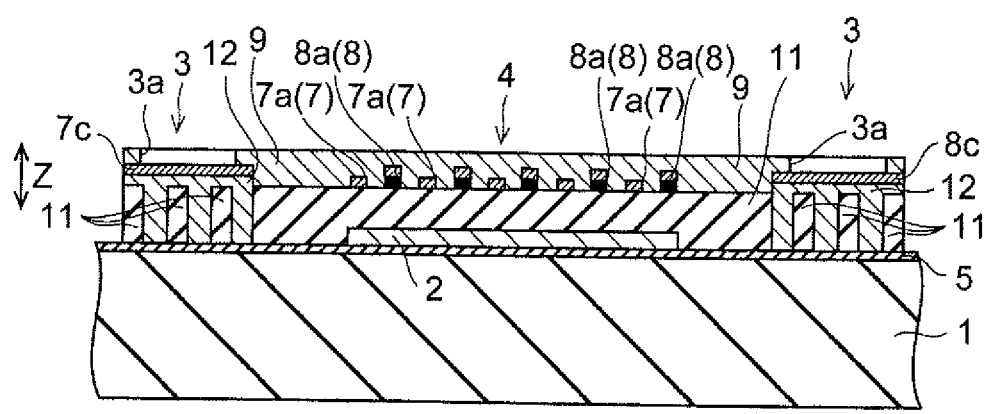
FIG. 28 is a cross sectional view for illustrating a manufacturing method of the power generation apparatus according to the first embodiment of the present invention.

Next, as illustrated in FIG. 26, a second parylene layer 13 is formed by vapor deposition so as to cover the base electrode portion, the pad electrode 8c and the connecting portion 8b of the second electrode 8 (see FIG. 15). Then, the second parylene layer 13 is patterned in the shape as illustrated in FIG. 27. Thus, the proof mass 4 (see FIG. 11), the beam portions 9 (see FIG. 11) and the frame portions 3 (see FIG. 11) that are made of parylene are formed. In this case, as illustrated in FIGS. 27 and 28, the opening portions 3a are formed in predetermined regions of the frame portion 3 so that the surfaces of the pad electrodes 7c and 8c are exposed. Note that the first parylene layer 12 and the second parylene layer 13 can be formed (by vapor deposition) at room temperature.

Finally, a predetermined region of the sacrificial layer 11 is removed by a dry etching method using $XeF_2$ gas, so that the proof mass 4 and the ferroelectric layer 2 are separated from each other. In this way, the power generation apparatus 50 according to the first embodiment of the present invention illustrated in FIG. 11 is formed.

In the manufacturing method of the first embodiment, as described above, the ferroelectric layer 2 made of $BaTiO_3$ is formed in a predetermined region on the ceramic substrate 1 by using a screen printing method, so that the ferroelectric layer 2 can easily be formed in the predetermined region. Therefore, manufacturing efficiency can be improved compared with the case where a plate-like ferroelectric layer is glued onto the substrate. Note that the power generation apparatus 50 according to the first embodiment can be manufactured without using a DRIE process.

In addition, in the first embodiment, the ferroelectric layer 2 made of $BaTiO_3$ is formed by using a screen printing method, so that the thickness t1 of the ferroelectric layer 2 can easily be increased compared with the case where the ferroelectric layer 2 is formed by a spattering method or a sol-gel method. Therefore, it is possible to suppress occurrence of inconvenience that it is difficult to increase the variation of capacitance value due to a small value of the thickness t1 of the ferroelectric layer 2. Thus, it is possible to obtain the power generation apparatus 50 having high power generation capacity while improving manufacturing efficiency.

In addition, in the first embodiment, the wiring layer 6 is formed on the upper surface of the ceramic substrate 1 (glaze layer 5) by using a screen printing method, so that the wiring layer 6 can easily formed. Therefore, this also can improve the manufacturing efficiency.

Second Embodiment

Figure 29:
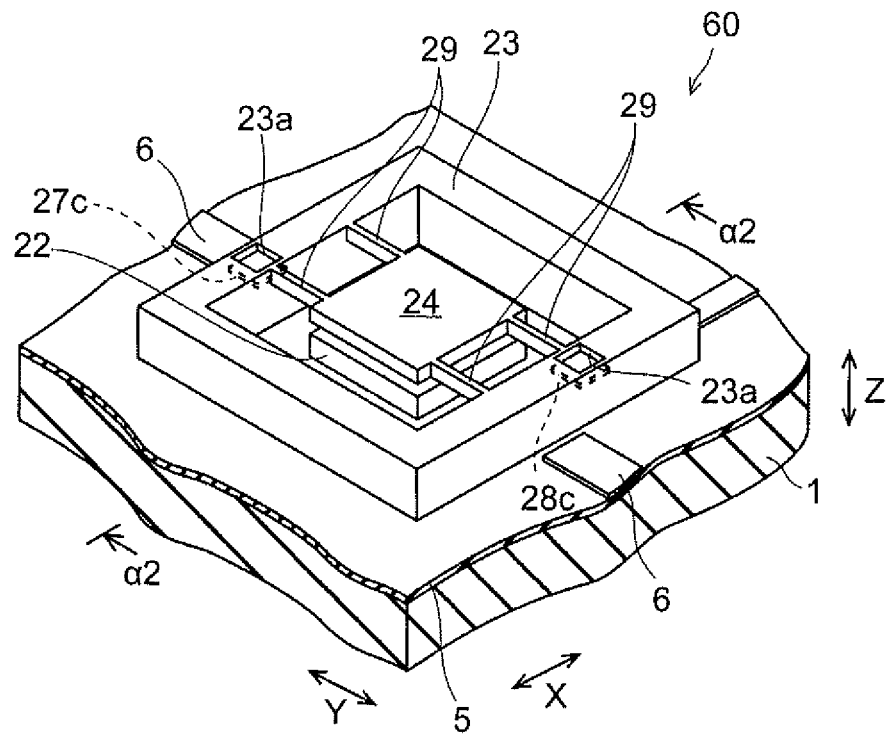
FIG. 29 is a perspective view illustrating a structure of a power generation apparatus according to a second embodiment of the present invention.
Figure 30:
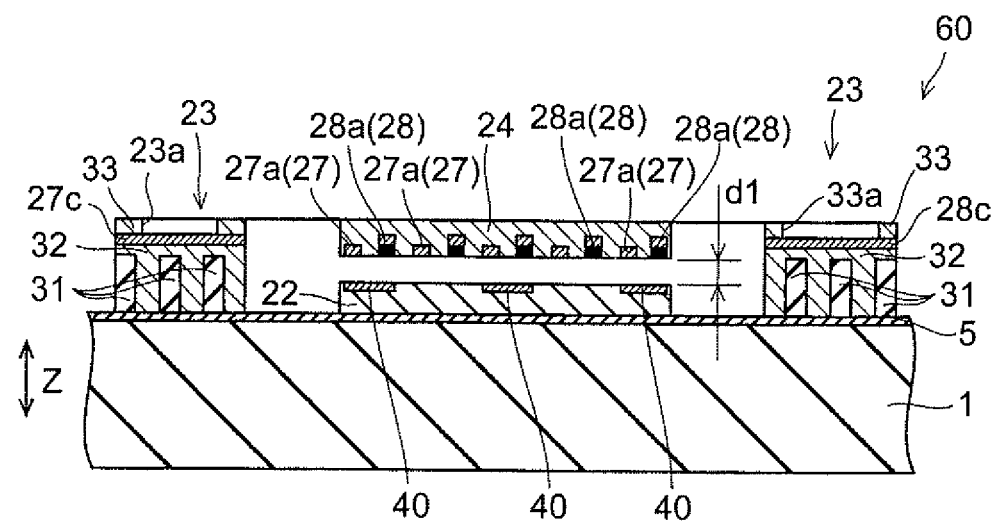
FIG. 30 is a cross sectional view cut along the line α2-α2 in FIG. 29.
Figure 31:
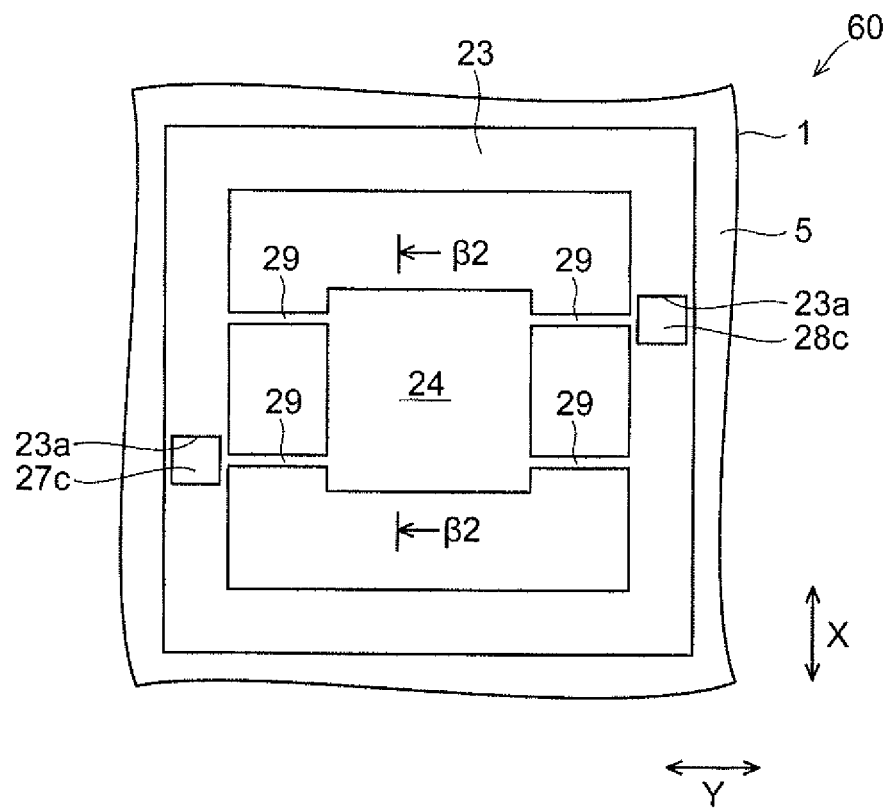
FIG. 31 is a plan view of the power generation apparatus according to the second embodiment of the present invention.

FIG. 29 is a perspective view illustrating a structure of a power generation apparatus according to a second embodiment of the present invention. FIG. 30 is a cross sectional view cut along the line α2-α2 in FIG. 29. FIG. 31 is a plan view of the power generation apparatus according to the second embodiment of the present invention illustrated in FIG. 29. FIGS. 32 to 35 are diagrams for illustrating the structure of the power generation apparatus according to the second embodiment of the present invention. First, with reference to FIGS. 29 to 35, the structure of a power generation apparatus 60 according to the second embodiment of the present invention will be described.

The power generation apparatus 60 according to the second embodiment includes a ceramic substrate 1, a ferroelectric layer 22 formed on the ceramic substrate 1, a frame portion 23 formed on the ceramic substrate 1 so as to surround the ferroelectric layer 22, and a proof mass 24 disposed inside the frame portion 23 as illustrated in FIGS. 29 and 30. Note that the ferroelectric layer 22 is an example of the "dielectric layer" in the present invention, and the proof mass 24 is an example of the "movable member" in the present invention.

The ceramic substrate 1 is made of $Al_2O_3$ and has a thickness of approximately 1 mm. A glaze layer 5 is formed on the upper surface of the ceramic substrate 1 similarly to the first embodiment. Note that the glaze layer 5 is formed for obtaining a smooth surface that is suitable for forming the ferroelectric layer 22 and the like thereon. In addition, as illustrated in FIG. 29, a wiring layer 6 is formed on the upper surface of the ceramic substrate 1 (glaze layer 5) in a predetermined region outside the frame portion 23 by a screen printing method. The wiring layer 6 is made of Au (gold), for example.

Figure 32:
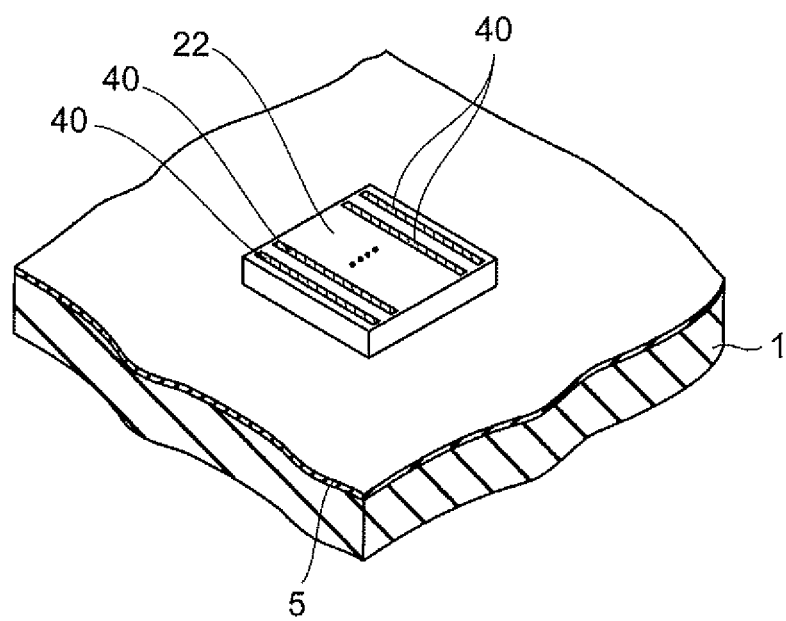
FIG. 32 is a perspective view illustrating a structure of a ferroelectric layer of the power generation apparatus according to the second embodiment of the present invention.

Here, the ferroelectric layer 22 of the second embodiment is made of $BaTiO_3$ (having a relative permittivity of 1,000 or larger) similarly to the first embodiment. In addition, the ferroelectric layer 22 is formed on the ceramic substrate 1 (glaze layer 5) in a predetermined region by a screen printing method as illustrated in FIGS. 30 and 32. The ferroelectric layer 22 has substantially a rectangular shape in a plan view.

In addition, the ferroelectric layer 22 is formed to have a thickness of 5 μm or larger. Specifically, the ferroelectric layer 22 is formed to have a thickness t11 of 5 to 20 μm (see FIG. 35).

In addition, in the second embodiment, as illustrated in FIGS. 30 and 32, metal layers 40 (floating electrode) made of aluminum (Al) is formed in a predetermined region on the upper surface side of the ferroelectric layer 22. The metal layers 40 are formed in a predetermined pattern not to protrude from the upper surface of the ferroelectric layer 22. Specifically, metal layers 40 are formed so as to extend in parallel with comb teeth portions 27a and 28a of a first electrode 27 and a second electrode 28 in a plan view, which will be described later. In addition, the metal layers 40 are formed so that the upper surfaces thereof are substantially the same level as the upper surface of the ferroelectric layer 22.

Figure 34:
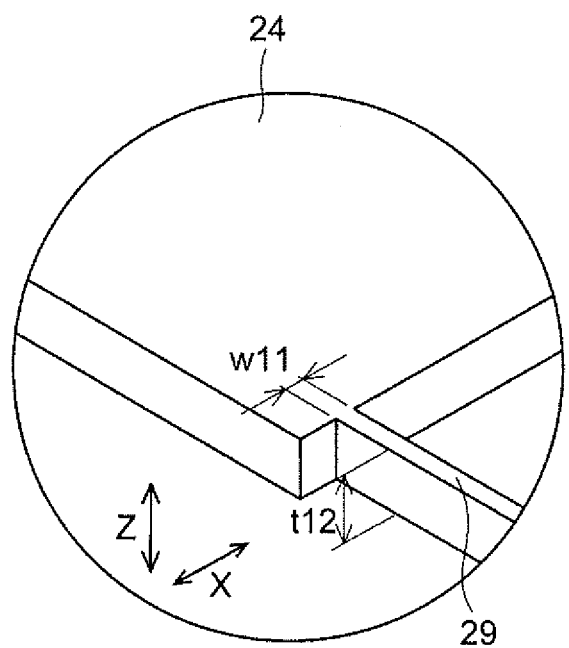
FIG. 34 is an enlarged perspective view of a structure of a beam portion of the power generation apparatus according to the second embodiment of the present invention.
Figure 35:
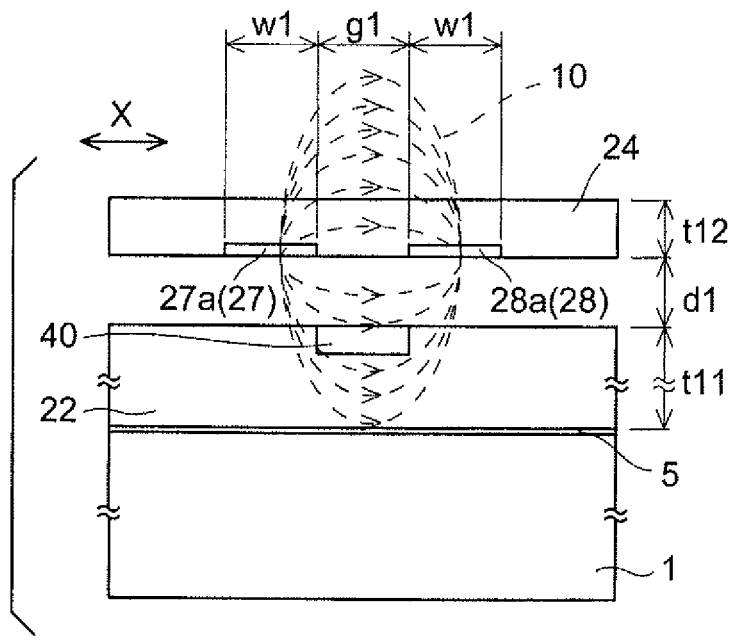
FIG. 35 is a cross sectional view cut along the line β2-β2 in FIG. 31.

In addition, the proof mass 24 is made of parylene (a resin of paraxylene system) and is formed to have a thickness t12 of approximately 5 μm (see FIG. 34) as illustrated in FIGS. 30 and 35. In addition, the proof mass 24 is formed to have substantially a rectangular shape (with a side length of approximately 1000 μm) in a plan view as illustrated in FIG. 31.

Figure 33:
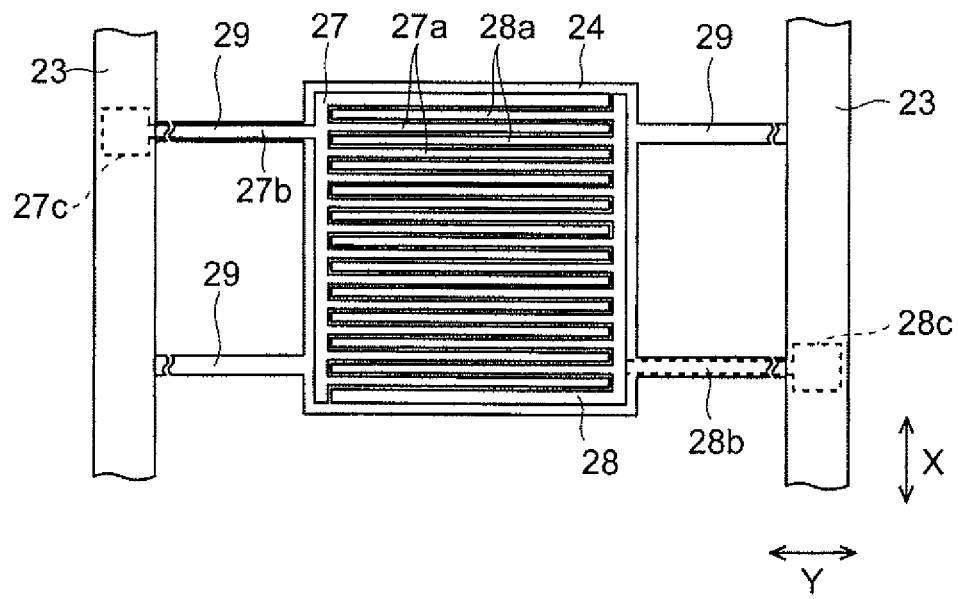
FIG. 33 is a plan view of a proof mass of the power generation apparatus according to the second embodiment of the present invention, which is viewed from the bottom side.

In addition, in the second embodiment, as illustrated in FIG. 33, two electrodes (first electrode 27 and second electrode 28) are formed on the back side (under surface side) of the proof mass 24 so as to be adjacent to each other in the same plane. Specifically, each of the first electrode 27 and the second electrode 28 is formed like a comb teeth in a plan view. In addition, the comb teeth portions 27a of the first electrode 27 and the comb teeth portions 28a of the second electrode 28 are arranged alternately. In addition, as illustrated in FIG. 35, a width w1 of the comb teeth portion 27a of the first electrode 27 and a width w1 of the comb teeth portion 28a of the second electrode 28 are approximately 5 μm each. In addition, a length g1 from the comb teeth portions 27a of the first electrode 27 to a neighboring comb teeth portion 28a of the second electrode 28 is approximately 5 μm. Note that the first electrode 27 and the second electrode 28 are formed in substantially the entire surface of the back side (under surface side) of the proof mass 24 in the power generation apparatus 60 according to the second embodiment as illustrated in FIG. 33.

The first electrode 27 described above corresponds to the opposing electrode and is made of metal material such as aluminum (see B4 in FIGS. 3A to 3C and 4, and E10 in FIG. 8D). In addition, the second electrode 28 described above has a lamination structure of an electret portion (CYTOP film or the like) for holding a predetermined amount of electric charge semipermanently and a base electrode portion (aluminum or the like) for setting a potential reference in the power generation (see B2 and B3 in FIGS. 3A to 3C and 4, E9 in FIG. 8C, and E12 in FIG. 8E).

In addition, the proof mass 24 includes four beam portions 29 are connected integrally to the proof mass 24 as illustrated in FIGS. 29 and 31. The four beam portions 29 are disposed on two opposed sides of the proof mass 24 so that two of them are disposed on each side and extend in the same direction in a plan view. In addition, end portions of the four beam portions 29 are connected to the frame portion 23 integrally. Thus, the proof mass 24 is supported above the ferroelectric layer 22 so as to be opposed to the ferroelectric layer 22 as illustrated in FIGS. 29 and 30. Note that a distance d1 between the upper surface of the ferroelectric layer 22 and the proof mass 24 (the first electrode 27 and the second electrode 28) is approximately 1 μm (see FIGS. 30 and 35).

In addition, in the second embodiment, as illustrated in FIG. 34, the beam portion 29 has a thickness t12 of 10 μm or larger and a width w11 of approximately 3 μm. In other words, a length in the thickness direction of the beam portion 29 is larger than a length in the width direction of the same so that the beam portion 29 can easily be deformed elastically in the direction of an arrow X that is parallel to the upper surface (principal surface) of the ceramic substrate 1 (see FIG. 29). Thus, when an acceleration is applied to the proof mass 24 supported by the four beam portions 29, the proof mass 24 can be moved by its inertial force in the direction of the arrow X that is horizontal with respect to the upper surface (principal surface) of the ceramic substrate 1.

In addition, the above-mentioned first electrode 27 is electrically connected to a pad electrode 27c via a connecting portion 27b as illustrated in FIG. 33. On the other hand, the electret portion of the above-mentioned second electrode 28 that holds a predetermined amount of electric charge semipermanently is in an electrically insulated state, while the base electrode portion of the same for setting the potential reference in the power generation is electrically connected to a pad electrode 28c via a connecting portion 28b. Note that the pad electrode 27c is an electrode for outputting current obtained by the power generation and is connected to a load to which the current is supplied when the power generation apparatus 60 is used. On the other hand, the pad electrode 28c is an electrode for setting the potential reference in the power generation and is connected to a predetermined reference potential when the power generation apparatus 60 is used. In addition, although not illustrated clearly in this diagram, the power generation apparatus 60 of this embodiment is equipped with an electret terminal for injecting a predetermined amount of electric charge into the electret portion of the second electrode 28 by contact discharge in the manufacturing process (final stage) of the power generation apparatus 60. Note that the electret terminal is connected to a predetermined contact discharge apparatus (high voltage applying apparatus) when the charge injection is performed, and is opened or connected to the ground when the power generation apparatus 60 is used.

In addition, the frame portion 23 has a thickness larger than that of the proof mass 24 as illustrated in FIG. 30, and has a function of supporting the proof mass 24 via the beam portions 29 as illustrated in FIGS. 29 and 31. Note that the frame portion 23 is made mainly of parylene. In addition, opening portions 23a are formed in predetermined regions of the frame portion 23 so that the surfaces of the pad electrodes 27c and 28c are exposed.

Other structures of the second embodiment are the same as those of the first embodiment.

Figure 36:
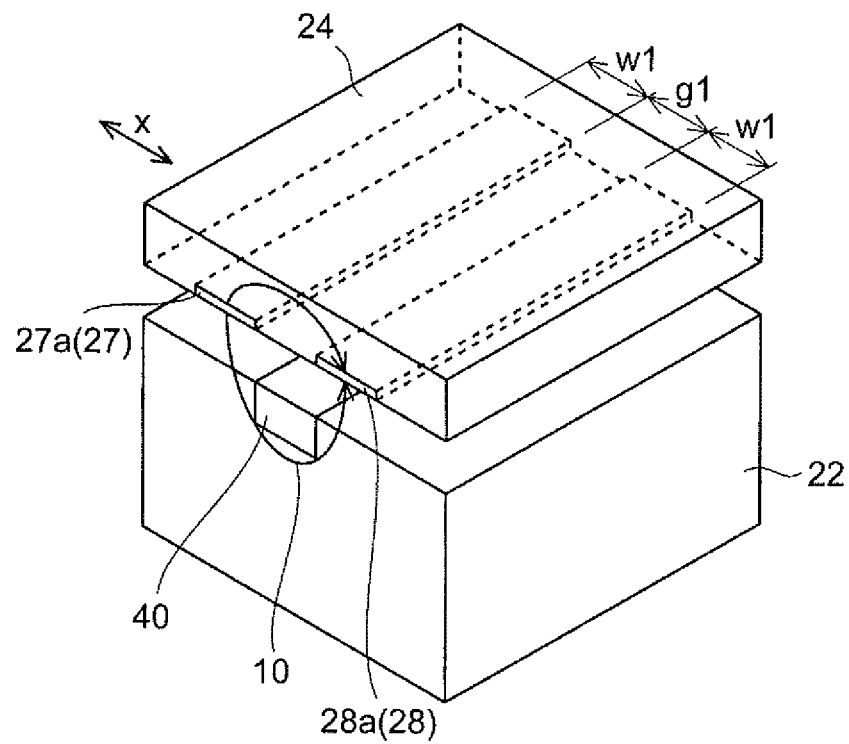
FIG. 36 is a perspective view for illustrating an operation of the power generation apparatus according to the second embodiment of the present invention.

FIG. 36 is a diagram for illustrating an operation of the power generation apparatus according to the second embodiment of the present invention. Next, an operation of the power generation apparatus 60 according to the second embodiment of the present invention will be described with reference to FIGS. 33, 35 and 36.

In the power generation apparatus 60 according to the second embodiment, a fringe electric field 10 (electric field generated beside a part between electrodes) is generated between the comb teeth portion 27a of the first electrode 27 and the comb teeth portion 28a of the second electrode 28 as illustrated in FIGS. 35 and 36. Here, the first electrode 27 and the second electrode 28 that generate the fringe electric field 10 are formed in comb teeth shapes, and the comb teeth portions 27a and 28a of them are arranged alternately as illustrated in FIG. 33. Therefore, the fringe electric field 10 is generated uniformly in substantially the entire surface of the back side (under surface side) of the proof mass 24. On the other hand, the ferroelectric layer 22 that is opposed to the proof mass 24 is disposed in the generated fringe electric field 10.

If a vibration in the horizontal direction (X direction) is applied to the power generation apparatus 60 in this state, the proof mass 24 is moved in the direction of the arrow X that is the horizontal direction with respect to the upper surface of the ceramic substrate 1 because of the inertial force that acts on the proof mass 24. Here, the electric flux lines of the fringe electric field 10 generated between the first electrode 27 and the second electrode 28 can penetrate into the ferroelectric layer 22 but cannot penetrate into the metal layer 40. Therefore, when the proof mass 24 moves in the direction of the arrow X, appearance of the electric flux lines varies, and a capacitance value of the capacitor formed between two electrodes varies in accordance with a variation of the aspect of the electric flux lines. Along with the above-mentioned variation of capacitance, a predetermined amount of electric charge is induced in the first electrode 27 (opposing electrode) and is output as electric current.

Next, a computer simulation is performed in the same manner as in the first embodiment for confirming the effect of the power generation apparatus 60 according to the second embodiment. A result of the computer simulation is shown in FIG. 37.

Figure 37:
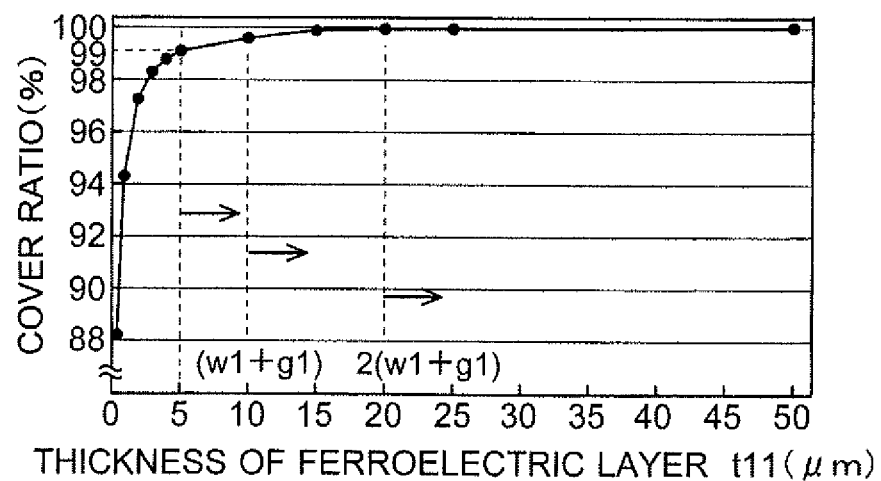
FIG. 37 is a graph illustrating a relationship between a thickness of the ferroelectric layer and a cover ratio.

As illustrated in FIG. 37, it was found that 99% or higher cover ratio can be obtained by setting the thickness t11 of the ferroelectric layer 22 to 5 μm or larger. In addition, it was found that substantially 100% (99.8% or higher) cover ratio can be obtained by setting the thickness t11 of the ferroelectric layer 22 to 10 μm or larger, and 100% cover ratio can be obtained by setting the same to 20 μm or larger. Note that if the thickness t11 of the ferroelectric layer 22 is 10 μm, the thickness t11 of the ferroelectric layer 22 agrees with the sum length (w1+g1, approximately 10 μm) of the width w1 (approximately 5 μm) of the comb teeth portions 27a (or 28a) of the first electrode 27 or the second electrode 28 and the length g1 (approximately 5 μm) from the comb teeth portions 27a of the first electrode 27 to a neighboring comb teeth portion 28a of the second electrode 28. In addition, if the thickness t11 of the ferroelectric layer 22 is 20 μm, the thickness t11 of the ferroelectric layer 22 is equal to twice (2(w1+g1)) of the above-mentioned sum length (w1+g1, approximately 10 μm).

As described above, it was confirmed that a sufficient value of the cover ratio can be obtained by setting the thickness t11 of the ferroelectric layer 22 to 5 μm or larger, so that the variation of capacitance value corresponding to the displacement of the proof mass 24 can be sufficiently large. Thus, it was confirmed that the power generation capacity can be improved.

In the second embodiment, as described above, the first electrode 27 and the second electrode 28 are formed on the ferroelectric layer 22 side of the proof mass 24, so that the fringe electric field 10 can be generated between the comb teeth portions 27a of the first electrode 27 and the comb teeth portions 28a of the second electrode 28. In addition, the metal layer 40 is formed in a predetermined pattern in a predetermined region on the upper surface side of the ferroelectric layer 22, so that an aspect of the electric flux lines in the fringe electric field 10 can be varied even if the proof mass 24 moves in the direction of the arrow X that is parallel to the upper surface (principal surface) of the ceramic substrate 1. In other words, the electric flux lines in the fringe electric field 10 generated between the comb teeth portions 27a of the first electrode 27 and the comb teeth portions 28a of the second electrode 28 can penetrate into the ferroelectric layer 22 but cannot penetrate into the metal layer 40. Therefore, by forming the metal layer 40 in a predetermined pattern in a predetermined region on the upper surface side of the ferroelectric layer 22, the aspect of the electric flux lines in the fringe electric field 10 can be varied when the proof mass 24 moves in the direction of the arrow X. Thus, a capacitance value of the capacitor formed between two electrodes varies in accordance with the variation of the aspect of the electric flux lines. Therefore, a predetermined amount of electric charge is induced in the first electrode 27 (opposing electrode) along with the variation of capacitance value and is output as electric current.

In addition, in the second embodiment, the metal layers 40 are formed not to protrude from the upper surface of the ferroelectric layer 22. Even if the metal layers 40 are formed on the upper surface side of the ferroelectric layer 22, the following manufacturing process can be performed similarly to the case where the metal layer 40 are not formed. Therefore, it is possible to suppress occurrence of inconvenience that the following manufacturing process becomes complicated if the metal layers 40 protrude from the upper surface of the ferroelectric layer 22. Thus, manufacturing efficiency can easily be improved.

In addition, in the second embodiment, by forming the metal layer 40 not to protrude from the upper surface of the ferroelectric layer 22, it is possible to suppress engagement between the metal layer 40 and the proof mass 24 (the first electrode 27 and the second electrode 28) when the proof mass 24 moves in the direction of the arrow X that is parallel to the upper surface (principal surface) of the ceramic substrate 1 (ferroelectric layer 22). Therefore, it is possible to suppress occurrence of inconvenience that movement of the proof mass 24 in the direction of the arrow X that is parallel to the upper surface (principal surface) of the ceramic substrate 1 (ferroelectric layer 22) is disturbed if the metal layer 40 engages with the proof mass 24 (the first electrode 27 and the second electrode 28). Thus, the vibration in the direction of the arrow X that is parallel to the upper surface (principal surface) of the ceramic substrate 1 (ferroelectric layer 22) can easily be converted into current to be output.

In addition, in the second embodiment, the ferroelectric layer 22 is made of $BaTiO_3$. Since $BaTiO_3$ is a metal oxide (ferroelectric substance) having a relative permittivity of 1,000 or larger, the ferroelectric layer 22 can have a sufficiently large relative permittivity. Thus, the variation of capacitance value can easily be increased, so that a large current can be taken from the vibration in the direction of the arrow X that is parallel to the upper surface (principal surface) of the ceramic substrate 1 (ferroelectric layer 22). Note that $BaTiO_3$ is a ferroelectric substance that does not contain Pb (lead). Therefore, if the ferroelectric layer 22 is made of $BaTiO_3$, an environment load due to waste can be reduced, and a bad influence to a human body can be reduced.

In addition, in the second embodiment, a length in the thickness direction of the beam portion 29 for supporting the proof mass 24 is larger than a length in the width direction of the same, so that a movement of the proof mass 24 in the vertical direction (in the direction of the arrow Z) with respect to the upper surface (principal surface) of the ceramic substrate 1 (ferroelectric layer 22) can be suppressed. Therefore, it is possible to suppress dispersion of the vibrational energy to the vertical direction. Thus, efficient power generation can easily be obtained from the vibration in the direction of the arrow X that is parallel to the upper surface (principal surface) of the ceramic substrate 1 (ferroelectric layer 22).

In addition, in the second embodiment, similarly to the first embodiment, the thickness t11 of the ferroelectric layer 22 is set to 5 µm or larger, so that 99% or higher cover ratio can be obtained. Therefore, the variation of capacitance value can be increased. Thus, more efficient power generation can be achieved from the vibration in the direction of the arrow X that is parallel to the upper surface (principal surface) of the ceramic substrate 1 (ferroelectric layer 22).

Further, in the second embodiment, the glaze layer 5 is formed between the ceramic substrate 1 and the ferroelectric layer 22, so that the smoothness of the upper surface of the ferroelectric layer 22 can be improved. Therefore, by controlling a grain size of $BaTiO_3$, unevenness of approximately 0.1 to 0.2 µm can be formed on the upper surface of the ferroelectric layer 22.

Note that other effects of the second embodiment are the same as those of the first embodiment.

FIGS. 38 to 48 are diagrams for illustrating a manufacturing method of the power generation apparatus according to the second embodiment of the present invention. Next, with reference to FIGS. 29, 33 to 35 and 38 to 48, a manufacturing method of the power generation apparatus 60 according to the second embodiment of the present invention will be described. Note that the power generation apparatus 60 according to the second embodiment is manufactured by using mainly the surface micromachining technology.

Figure 38:
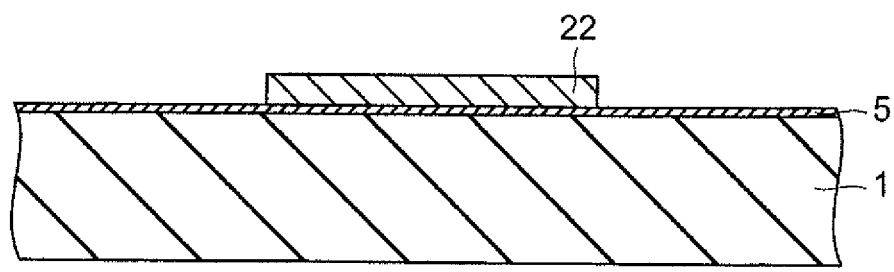
FIG. 38 is a cross sectional view for illustrating a manufacturing method of the power generation apparatus according to the second embodiment of the present invention.

First, as illustrated in FIG. 38, a glaze layer 5 is formed on the upper surface of the ceramic substrate 1 made of $Al_2O_3$ having a thickness of approximately 1 mm. This glaze layer 5 is formed by, for example, printing liquid containing a glass component on the ceramic substrate 1 and afterward baking at a predetermined temperature.

Next, by using a screen printing method, the wiring layer 6 illustrated in FIG. 29 is formed on the glaze layer 5. Note that if the wiring layer 6 is formed by the screen printing method, the wiring layer 6 can be formed easily, so that manufacturing efficiency can be improved.

After that, as illustrated in FIG. 38, the ferroelectric layer 22 is formed by using a screen printing method in a predetermined region on the ceramic substrate 1 (glaze layer 5). Specifically, paste containing $BaTiO_3$ is printed in the predetermined region on the glaze layer 5, and afterward it is baked at a baking temperature of approximately 800 to 1200 degrees Celsius, so that the ferroelectric layer 22 made of $BaTiO_3$ is formed.

In addition, the ferroelectric layer 22 is formed so that a thickness t11 (see FIG. 35) becomes 5 to 20 µm, and is formed so that unevenness of approximately 0.1 to 0.2 µm (not shown) is generated on the upper surface of the ferroelectric layer 22 by controlling a grain size of $BaTiO_3$.

Figure 39:
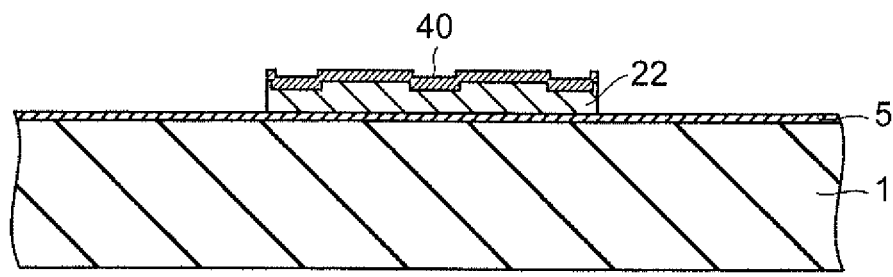
FIG. 39 is a cross sectional view for illustrating the manufacturing method of the power generation apparatus according to the second embodiment of the present invention.
Figure 40:
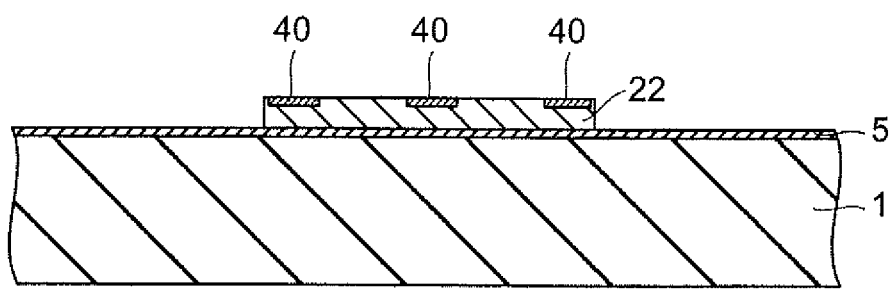
FIG. 40 is a cross sectional view for illustrating the manufacturing method of the power generation apparatus according to the second embodiment of the present invention.

Next, as illustrated in FIG. 39, the ferroelectric layer 22 is etched to have recesses, and afterward the metal layer 40 (made of aluminum) is formed by a spattering method or a vapor deposition method. Further, the surface is ground so that a specified ferroelectric and metal striped surface is formed as illustrated in FIG. 40. Thus, the metal layer 40 does not protrude from the upper surface of the ferroelectric layer 22.

Figure 41:
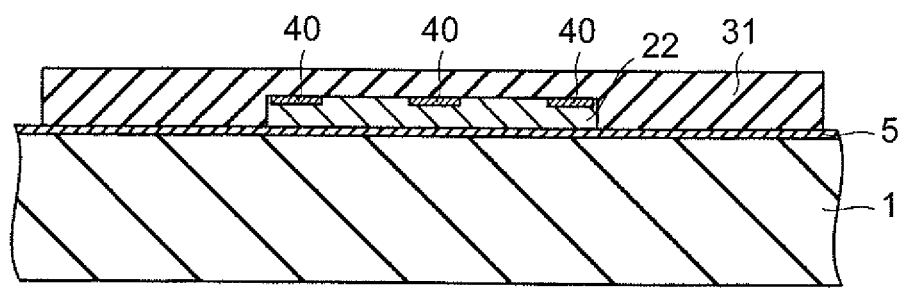
FIG. 41 is a cross sectional view for illustrating the manufacturing method of the power generation apparatus according to the second embodiment of the present invention.

After that, as illustrated in FIG. 41, by using a plasma CVD method, a sacrificial layer 31 made of amorphous silicon is formed on the glaze layer 5 so as to cover the ferroelectric layer 22. Here, the sacrificial layer 31 is a layer that is formed on the precondition that it is removed in a later step.

Figure 42:
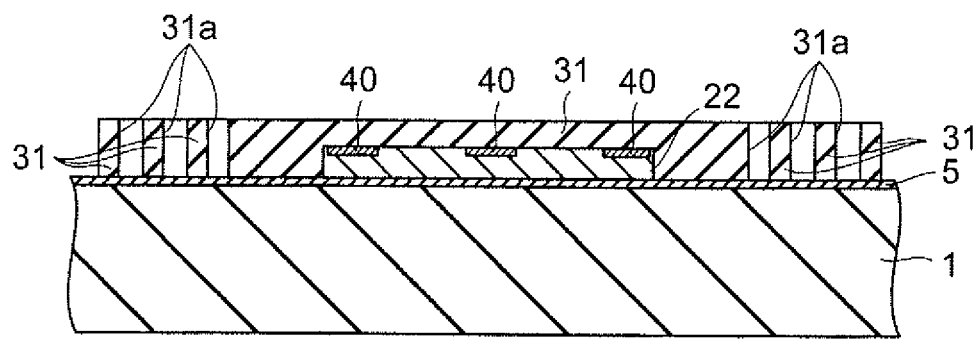
FIG. 42 is a cross sectional view for illustrating the manufacturing method of the power generation apparatus according to the second embodiment of the present invention.
Figure 43:
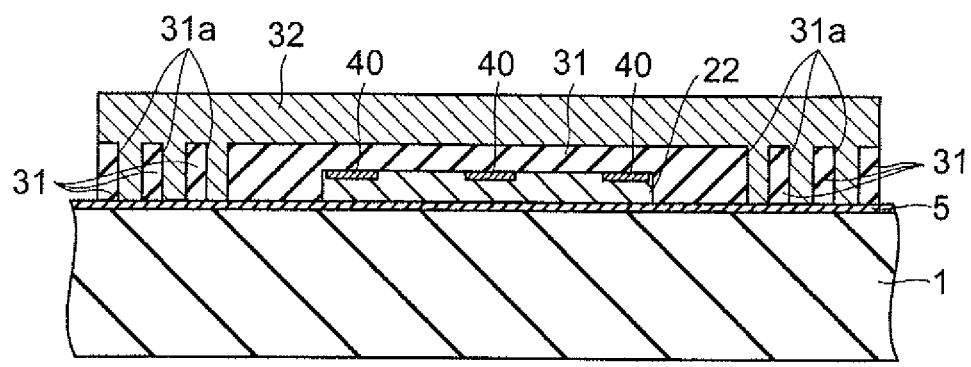
FIG. 43 is a cross sectional view for illustrating the manufacturing method of the power generation apparatus according to the second embodiment of the present invention.

Next, as illustrated in FIG. 42, by a photolithography technique and a dry etching technique using $SF_6$ plasma gas, elongated trench portions (slots) 31*a* are formed in the sacrificial layer 31. Then, as illustrated in FIG. 43, a first parylene layer 32 is formed by vapor deposition on the upper surface of the sacrificial layer 31. In this case, the first parylene layer 32 formed by vapor deposition in the trench portion 31*a* becomes the anchor portion for supporting the proof mass 24.

Figure 44:
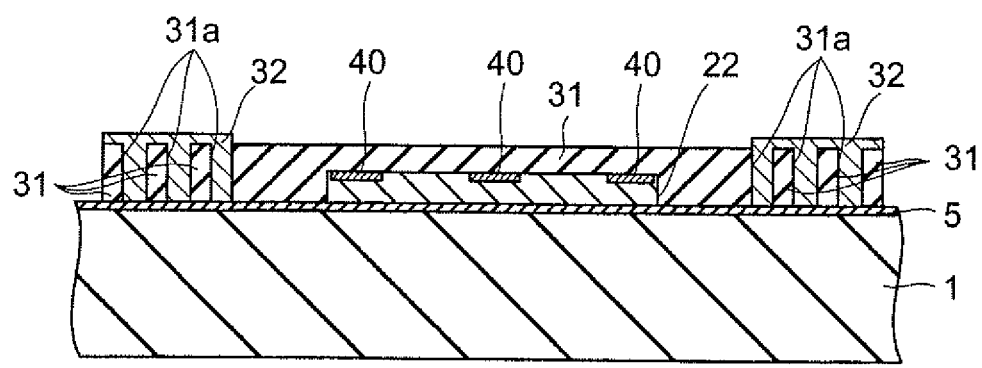
FIG. 44 is a cross sectional view for illustrating the manufacturing method of the power generation apparatus according to the second embodiment of the present invention.

Next, as illustrated in FIG. 44, by a photolithography technique and an etching technique using $O_2$ plasma gas, a predetermined region of the first parylene layer 32 is removed.

Figure 45:
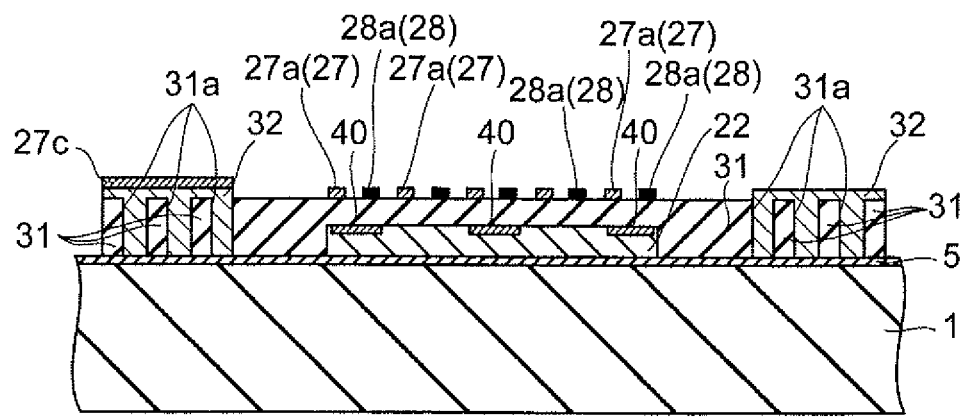
FIG. 45 is a cross sectional view for illustrating the manufacturing method of the power generation apparatus according to the second embodiment of the present invention.

After that, an aluminum layer is formed on the sacrificial layer 31 and the first parylene layer 32 by a spattering method or a vapor deposition method. In addition, as illustrated in FIG. 45, the formed aluminum layer is patterned by using a photolithography technique and a wet etching technique. Thus, the first electrode 27 having a comb teeth shape illustrated in FIG. 33 is formed, and the pad electrode 27*c* that is electrically connected to the first electrode 27 is formed. The connecting portion 27*b* (see FIG. 33) for connecting the first electrode 27 with the pad electrode 27*c* is also formed by patterning the above-mentioned aluminum layer simultaneously.

In addition, a CYTOP film is formed by spin coating on the sacrificial layer 31, and afterward the CYTOP film is etched by $O_2$ plasma. By this process, the electret portion of the second electrode 28 is formed in a comb teeth shape.

After that, a parylene layer for preventing discharge (see E11 in FIG. 8E about details although omitted in FIGS. 45 and 46) is formed on the sacrificial layer 31 and the first parylene layer 32 so as to cover the first electrode 27, the electret portion of the second electrode 28, the pad electrode 27*c*, and the connecting portion 27*b* (see FIG. 33). In addition, an aluminum layer is formed by spattering as the base electrode portion of the second electrode 28 and the pad electrode 28*c* to be connected to the second electrode 28 on the same. Note that the connecting portion 28*b* (see FIG. 33) for connecting the base electrode portion of the second electrode 28 with the pad electrode 28*c* is also formed by patterning the above-mentioned aluminum layer simultaneously.

Figure 46:
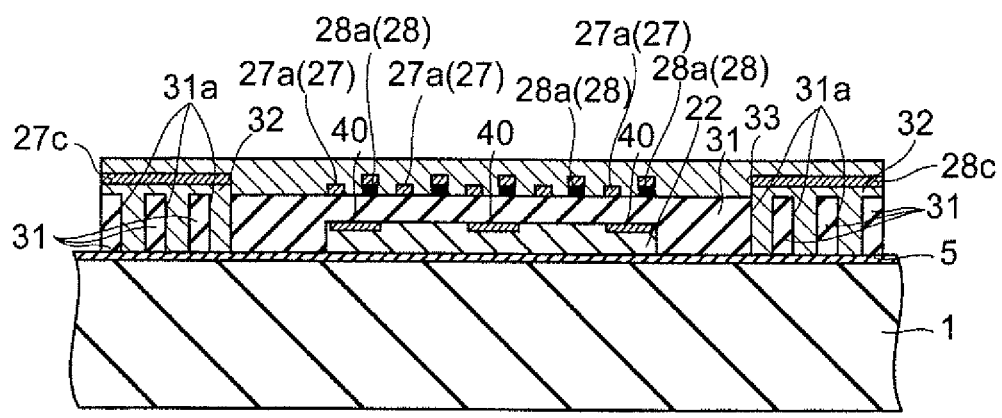
FIG. 46 is a cross sectional view for illustrating the manufacturing method of the power generation apparatus according to the second embodiment of the present invention.
Figure 47:
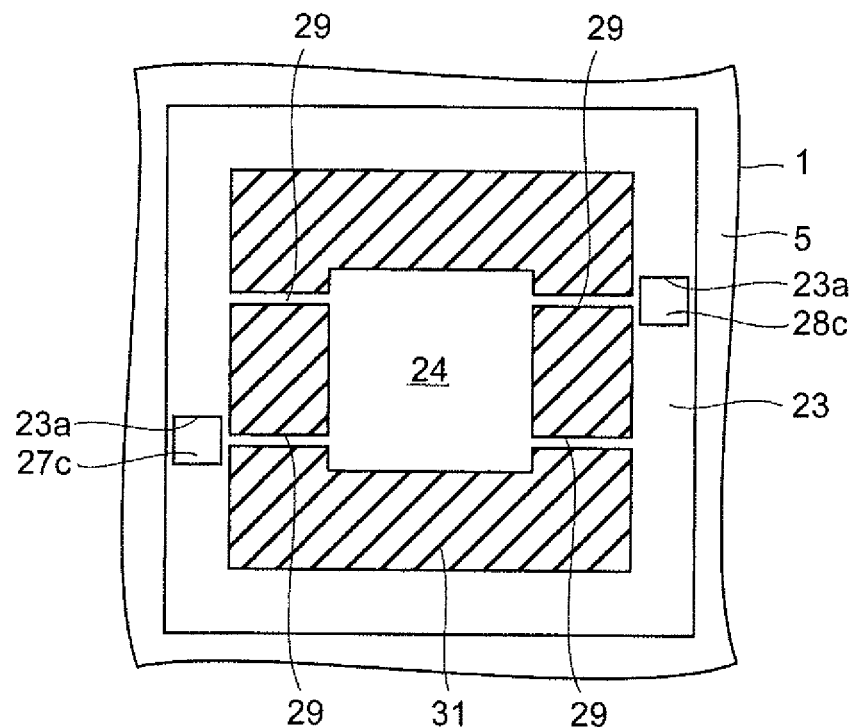
FIG. 47 is a plan view for illustrating a manufacturing method of the power generation apparatus according to the second embodiment of the present invention.

Next, as illustrated in FIG. 46, a second parylene layer 33 is formed by vapor deposition so as to cover the base electrode portion, the pad electrode 28*c* (see FIG. 33) and the connecting portion 28*b* (see FIG. 33) of the second electrode 28. Then, the second parylene layer 33 is patterned in the shape as illustrated in FIG. 47. In this case, as illustrated in FIG. 34, the four beam portions 29 are formed so that a length in the thickness direction thereof is larger than a length in the width direction thereof. Thus, the proof mass 24 (see FIG. 29), the beam portions 29 (see FIG. 29) and the frame portion 23 (see FIG. 29) made of parylene are formed. In this case, the opening portions 23*a* are formed in predetermined regions of the frame portion 23 so that the surfaces of the pad electrodes 27*c* and 28*c* are exposed. Note that the first parylene layer 32 and the second parylene layer 33 can be formed (by vapor deposition) at room temperature.

Figure 48:
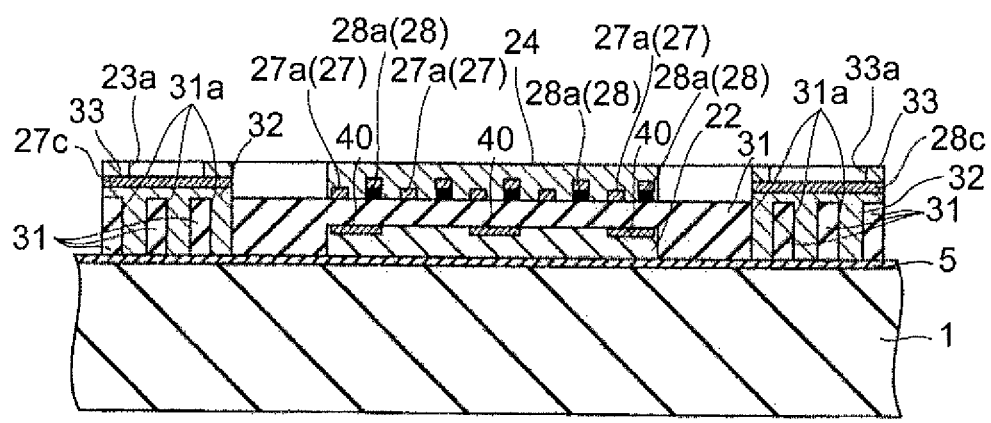
FIG. 48 is a cross sectional view for illustrating the manufacturing method of the power generation apparatus according to the second embodiment of the present invention.

Finally, a predetermined region of the sacrificial layer 31 is removed by a dry etching method using $XeF_2$ gas from the state illustrated in FIG. 48, so that the proof mass 24 and the ferroelectric layer 22 are separated from each other. In this way, the power generation apparatus 60 according to the second embodiment of the present invention illustrated in FIG. 29 is formed.

In the second embodiment, as described above, the ferroelectric layer 22 is formed in a predetermined region on the ceramic substrate 1 by using a screen printing method, so that the ferroelectric layer 22 can easily formed in a predetermined region on the ceramic substrate 1. Therefore, manufacturing efficiency can be improved compared with the case where a plate-like ferroelectric layer 22 is glued to a predetermined region on the ceramic substrate 1. Note that the power generation apparatus 60 according to the second embodiment can be manufactured without using a DRIE process.

Note that the embodiments disclosed here should be considered as examples and not a limitation in all points. The scope of the present invention is defined by not the above description of embodiments but by the attached claims, and further includes every modification within the scope of the claims and its equivalent meanings and range.

For instance, the first and the second embodiments described above exemplify the case where the ferroelectric layer is made of $BaTiO_3$, but the present invention is not limited to this structure. It is possible to form the ferroelectric layer of a metal oxide other than $BaTiO_3$ as long as the metal oxide has a relative permittivity of 1,000 or larger and can be processed by a screen printing method. In this case, it is preferable to use the metal oxide that does not contain Pb (lead).

In addition, the first and the second embodiments described above exemplify the case where the thickness of the ferroelectric layer is set to 5 to 20 μm, but the present invention is not limited to this structure. It is possible to set the thickness of the ferroelectric layer to 20 μm or larger. Note that the ferroelectric layer is formed by a screen printing method as described above. Therefore, it is easy to form the ferroelectric layer having a thickness of 20 μm or larger.

In addition, the first and the second embodiments described above exemplify the case where the ferroelectric layer is formed by using a screen printing method on the glaze layer formed on the ceramic substrate, but the present invention is not limited to this structure. It is possible to form the ferroelectric layer by a screen printing method on the ceramic substrate without the glaze layer.

In addition, the first and the second embodiments described above exemplify the case where the ferroelectric layer is formed by baking at a baking temperature of approximately 800 to 1200 degrees Celsius, but the present invention is not limited to this structure. It is possible to form the ferroelectric layer by baking at a baking temperature other than the above-mentioned baking temperature. For instance, it is possible to perform the baking at a relatively high baking temperature of approximately 1200 to 1500 degrees Celsius or at a relatively low baking temperature of 700 degrees Celsius or lower. Note that if the baking is performed at a baking temperature of approximately 1200 to 1500 degrees Celsius, the ferroelectric layer is formed on the ceramic substrate without the glaze layer, and the wiring layer is formed after forming the ferroelectric layer, so that the power generation apparatus described in the above embodiments can be manufactured. In addition, if the baking is performed at a baking temperature of 700 degrees Celsius or lower, it is preferable that a relative permittivity of the ferroelectric layer should be larger than 1,000.

In addition, the first and the second embodiments described above exemplify the case where the ceramic substrate made of $Al_2O_3$ is used, but the present invention is not limited to this structure. It is possible to use a ceramic substrate made of a ceramic material other than $Al_2O_3$ or a ferroelectric material for the substrate so as to manufacture the power generation apparatus.

In addition, the first and the second embodiments described above have the structure in which the proof mass is supported by the frame portion, but the present invention is not limited to this structure. It is possible to adopt other structure in which the proof mass is supported by a member other than the frame portion.

Note that a plurality of through holes may be provided to the proof mass so as to penetrate from the upper surface to the under surface in the first and the second embodiments described above. If this structure is adopted, the sacrificial layer can easily be removed, and air resistance can be reduced.

In addition, the second embodiment described above exemplify the case where the metal layer is formed so as not to protrude from the upper surface of the ferroelectric layer, but the present invention is not limited to this structure. It is possible to form the metal layer so as to protrude from the upper surface of the ferroelectric layer.

In addition, the second embodiment described above exemplifies the case where the metal layer is made of aluminum, but the present invention is not limited to this structure. It is possible to form the metal layer of other metal than aluminum.

FIRST VARIATION EXAMPLE

Figure 49:
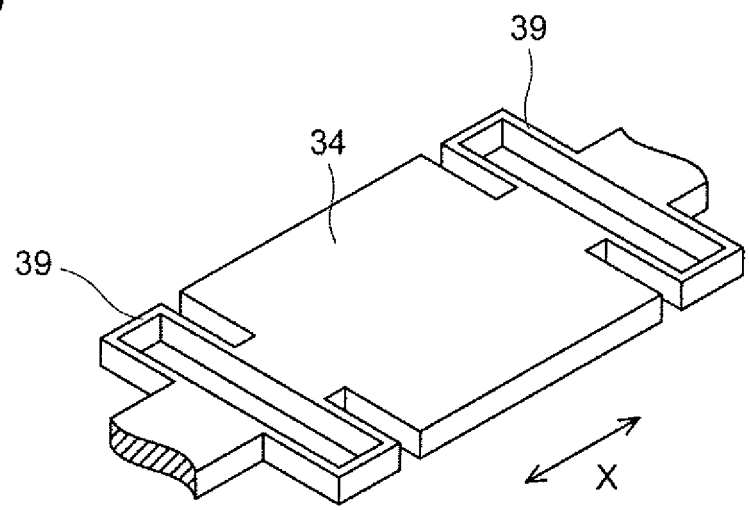
FIG. 49 is a perspective view illustrating a structure of a proof mass and a beam portion of a power generation apparatus according to a first variation example of the present invention.

In addition, the second embodiment describes the structure in which the proof mass is supported by the four beam portions, but the present invention is not limited to this structure. It is possible to adopt any other structure of the beam portion for supporting the proof mass than the structure according to the above embodiment as long as the proof mass can be moved in a predetermined direction that is parallel to the upper surface of the ceramic substrate. For instance, as illustrated in FIG. 49, it is possible to make a beam portion 39 for supporting a proof mass 34 so as to be flexible in the direction of the arrow X.

SECOND VARIATION EXAMPLE

Figure 50:
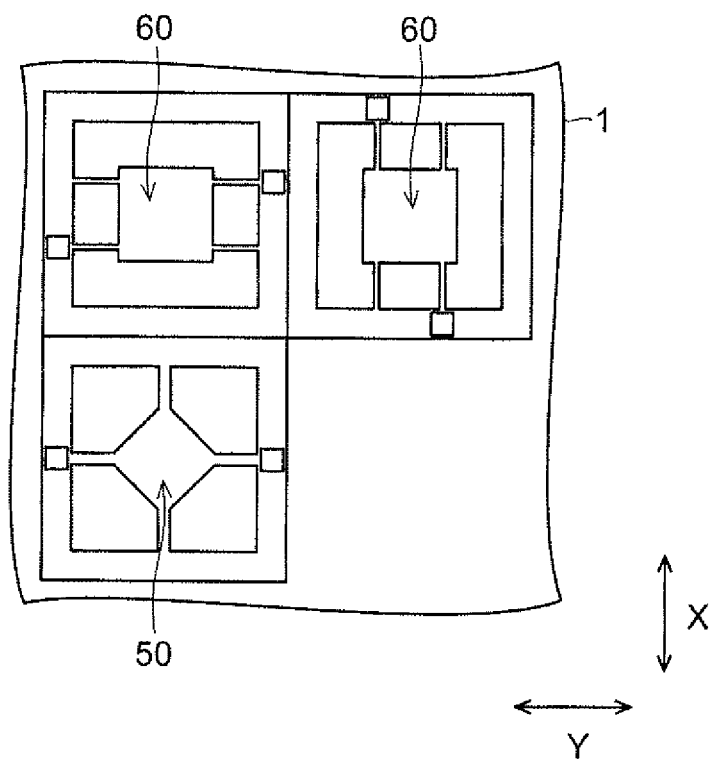
FIG. 50 is a perspective view illustrating a structure of a power generation apparatus according to a second variation example of the present invention.

In addition, the second embodiment described above exemplifies the case where the power generation apparatus has a structure in which the power generation can be performed from the vibration in the direction of the arrow X that is parallel with the upper surface of the ceramic substrate, but the present invention is not limited to this structure. It is possible to form a plurality of power generation apparatuses on a single ceramic substrate, so that power generation can be performed from vibrations in a plurality of directions simultaneously. For instance, as illustrated in FIG. 50, it is possible to provide at least two power generation apparatuses 60 for generating power from vibrations in the direction of the arrow X and the direction of the arrow Y that are parallel to the upper surface of the ceramic substrate 1, and a power generation apparatus 50 for generating power from a vibration in the vertical direction with respect to the upper surface of the ceramic substrate 1 on a single ceramic substrate 1, so that power generation is performed from vibrations in the three axes directions.

THIRD VARIATION EXAMPLE

Figure 51A:
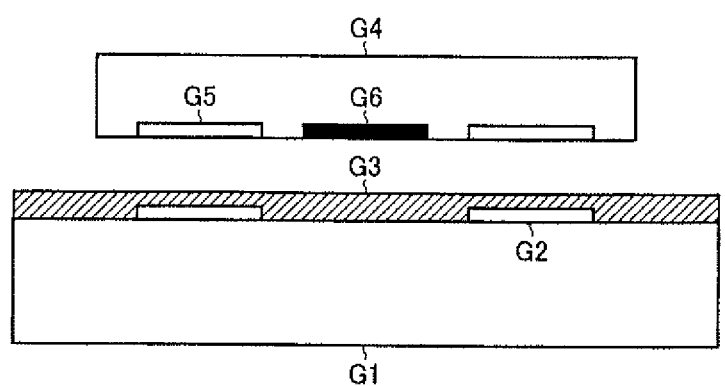
FIG. 51A is cross sectional view illustrating a structure of a power generation apparatus (metal layer protruding type) according to a third variation example of the present invention.
Figure 51B:
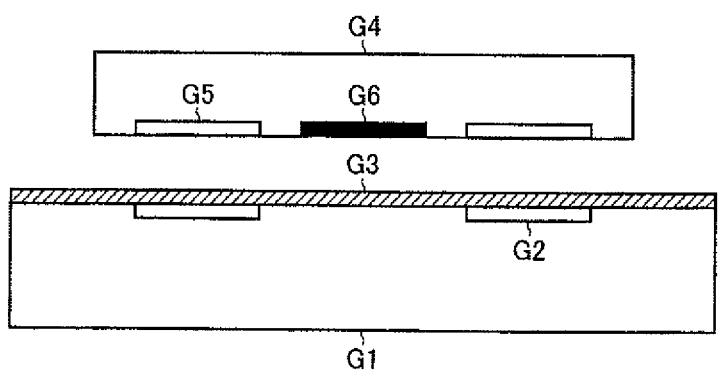
FIG. 51B is cross sectional view illustrating a structure of a power generation apparatus (metal layer embedded type) according to a third variation example of the present invention.

Next, a third variation example of the power generation apparatus described above (in particular, the power generation apparatus of the second embodiment in which the power generation is performed from the horizontal vibration) will be described in detail. FIGS. 51A and 51B are cross sectional views illustrating a structure of a power generation apparatus according to the third variation example of the present invention. Note that the power generation apparatus illustrated in FIG. 51A has the structure in which metal layers (floating electrodes) G2 are formed so as to protrude from the surface of a ferroelectric substrate G1 similarly to the structure illustrated in FIGS. 3A to 3C. In contrast, the power generation apparatus illustrated in FIG. 51B has the structure in which the metal layers G2 are embedded in the surface of the ferroelectric substrate G1 similarly to the structure illustrated in FIG. 30.

Here, the power generation apparatus of the third variation example includes a protective layer G3 that covers the ferroelectric substrate G1 and the metal layer G2, and has a horizontal surface with respect to the movable member G4. Note that the protective layer G3 is preferably made of a material having a low friction coefficient and superior insulating performance such as a fluorocarbon resin or a polyimide resin (e.g., having a static friction coefficient of 0.5 or lower and a relative permittivity of 4.0 or lower). Note that a relative permittivity of an interlayer insulating film that is usually used in semiconductor devices is 4.0 or lower, and a relative permittivity of $SiO_2$ is 4.0, for example. The relative permittivity of the material of the protective layer G3 is desirable to be as small as possible. In view of availability of materials, an interlayer insulating film material that is usually used in semiconductor devices may be used.

For instance, if the structure includes the protective layer G3 having a small friction coefficient for example, the movable member G4 can move to slide on the surface of the protective layer G3 when the ferroelectric substrate G1 happens to contact with the movable member G4. Therefore, a mechanical breakdown of the power generation apparatus can be avoided. In addition, if the structure includes the protective layer G3 that is superior in the insulating performance, unwanted discharge hardly occur between the metal layer (floating electrode) G2 and the opposing electrode G5 or the electret electrode G6.

In particular, if the gap distance between the ferroelectric substrate G1 and the movable member G4 is small in the power generation apparatus, the above-mentioned problem of contact or discharge can easily occur. Therefore, it is desirable to adopt the structure of the third variation example.

Note that the metal layer G2 in FIG. 51B is formed so that the upper surface thereof is substantially flush with the upper surface of the ferroelectric substrate G1.

A method of forming the metal layer G2, like a fourth variation example that will be described later, includes forming trench portions in the surface of the ferroelectric substrate G1, and afterward depositing the metal layer G2 in the trench portions. In this case, a depth of the trench portion is designed appropriately so that the metal layer G2 has sufficient thickness for cutting off the fringe electric field. Note that a semiconductor layer (pure silicon layer or the like) can be used instead of the metal layer G2 so as to be deposited in the trench portion as long as it can cut off the fringe electric field appropriately.

According to the structure of FIG. 51B (i.e., the structure in which the metal layers G2 are embedded in the surface of the ferroelectric substrate G1), the gap distance between the ferroelectric substrate G1 and the movable member G4 can be decreased compared with the structure of FIG. 51A (i.e., the structure in which the metal layers G2 protrude from the surface of the ferroelectric substrate G1) by the thickness of the metal layer G2. Therefore, it is possible to contribute to downsizing of the power generation apparatus and improvement of power generation efficiency.

FOURTH VARIATION EXAMPLE

Figure 52A:
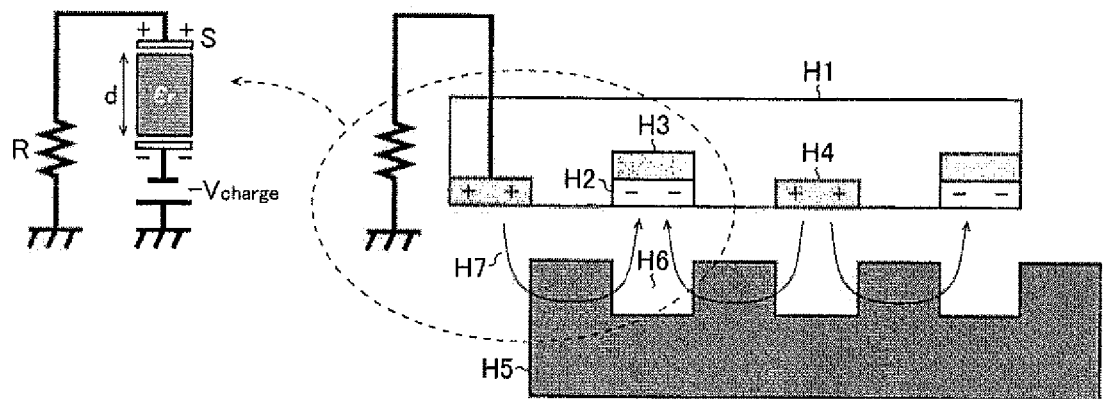
FIG. 52A is a schematic diagram for illustrating a principle of electricity generation of a power generation apparatus according to a fourth variation example of the present invention (initial position of the movable member)
Figure 52B:
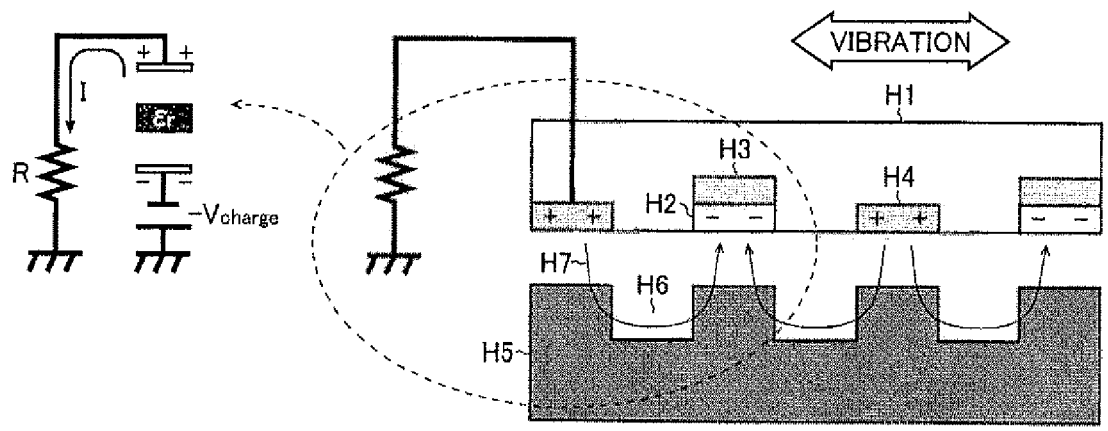
FIG. 52B is a schematic diagram for illustrating the principle of electricity generation of the power generation apparatus according to the fourth variation example of the present invention (after horizontal displacement of the movable member)

Next, a fourth variation example of the power generation apparatus described above (in particular, the power generation apparatus of the second embodiment in which the power generation is performed from the horizontal vibration) will be described in detail. FIGS. 52A and 52B are schematic diagrams for illustrating a principle of electricity generation of the power generation apparatus according to the fourth variation example of the present invention. Note that FIG. 52A illustrates a manner in which the movable member H1 exists in an initial position while FIG. 52B illustrates a manner in which the movable member H1 is moved in the horizontal direction. In addition, there is an equivalent circuit illustrating schematically the concept and the principle of operation of the power generation apparatus on the left side of each of FIGS. 52A and 52B.

In the power generation apparatus of the fourth variation example, trench portions H6 are formed in the surface of the ferroelectric substrate H5 instead of the metal layers. The trench portion H6 can be formed by wet etching, dry etching using an ICP device or the like, machining (dicing), or a laser beam process using an excimer laser or the like. In addition, in order to form structures of the movable member H1 or the like further on the ferroelectric substrate H5 in which the trench portion H6 is formed, the sacrificial layer made of amorphous silicon is formed to cover the ferroelectric substrate H5 so that a new horizontal surface is obtained as illustrated in FIG. 41. Then, desired structures are formed on the sacrificial layer, and afterward the sacrificial layer is removed finally.

Note that a depth of the trench portion H6 should be designed to have a value that is equal to or larger than a gap length between the movable member H1 and the ferroelectric substrate H5 (i.e., approximately 1 µm). In addition, it is preferable to design a width and a pitch of the trench portions H6 appropriately considering a relationship with a width and a pitch of the electret H2 and the opposing electrode H4. In addition, it is preferable to design a tapered shape of the trench portions H6 appropriately considering a processing step thereof.

A principle of operation of the power generation apparatus having the above-mentioned structure will be described. When the movable member H1 is moved in the horizontal direction by an external vibration input, a relative positional relationship between the fringe electric field H7 and the trench portion H6 varies as compared with reference to FIGS. 52A and 52B, so that the state of the electric flux line penetrating into the ferroelectric substrate H5 varies. For instance, in the initial position of the movable member H1 (see FIG. 52A), a protruding portion of the ferroelectric substrate H5 exists between the electret H2 and the opposing electrode H4, so that the gap length between the movable member H1 and the ferroelectric substrate H5 is relatively short, i.e., the electric flux line can easily penetrate into the ferroelectric substrate H5. In contrast, on the position after the horizontal displacement of the movable member H1 (see FIG. 52B), the trench portion H6 exists between the electret H2 and the opposing electrode H4, so that the gap length between the movable member H1 and the ferroelectric substrate H5 is relatively long, i.e., the electric flux line hardly penetrate into the ferroelectric substrate H5. This means that the capacitance C formed between the electret H2 and the opposing electrode H4 varies. The variation of the capacitance C occurs due to a variation of a volume ratio of the dielectric to the air between the two electrodes, i.e., a variation of the equivalent relative permittivity $\in_r$. Along with the above-mentioned variation of capacitance between the two electrodes, a predetermined amount of electric charge Q is induced in the opposing electrode H4. Then, the electric charge Q is output as current I based on the equation (2).

In this way, according to the power generation apparatus of the fourth variation example, power generation based on the horizontal vibration can be performed without providing a metal layer on the surface of the ferroelectric substrate H5. Therefore, it is possible to prevent unwanted discharge in the actual use. Thus, it is possible to decrease the gap distance between the ferroelectric substrate H5 and the movable member H1, so as to contribute to downsizing of the power generation apparatus and improvement of power generation efficiency.

Figure 53A:
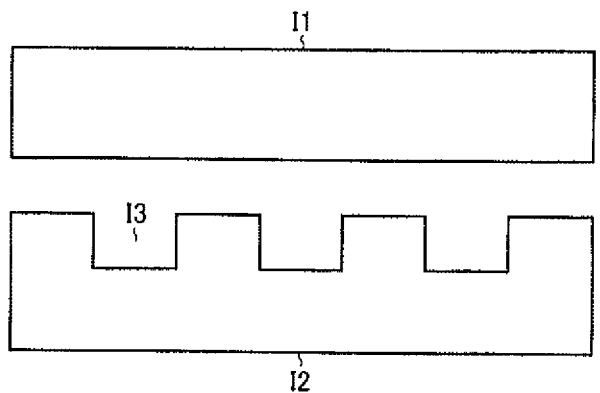
FIG. 53A is a cross sectional view illustrating a first structural example (trench type) of the power generation apparatus according to the fourth variation example of the present invention.
Figure 53B:
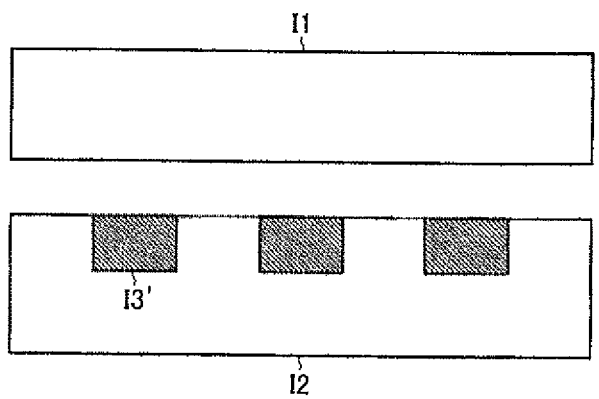
FIG. 53B is a cross sectional view illustrating a second structural example (silica lamination type) of the power generation apparatus according to the fourth variation example of the present invention.
Figure 53C:
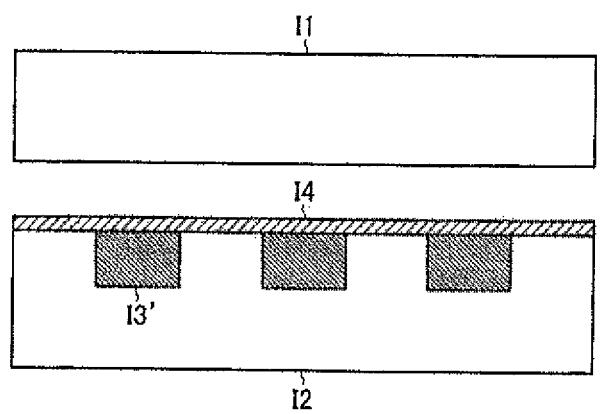
FIG. 53C is a cross sectional view illustrating a third structural example (protective layer formation type) of the power generation apparatus according to the fourth variation example of the present invention.
Figure 54:
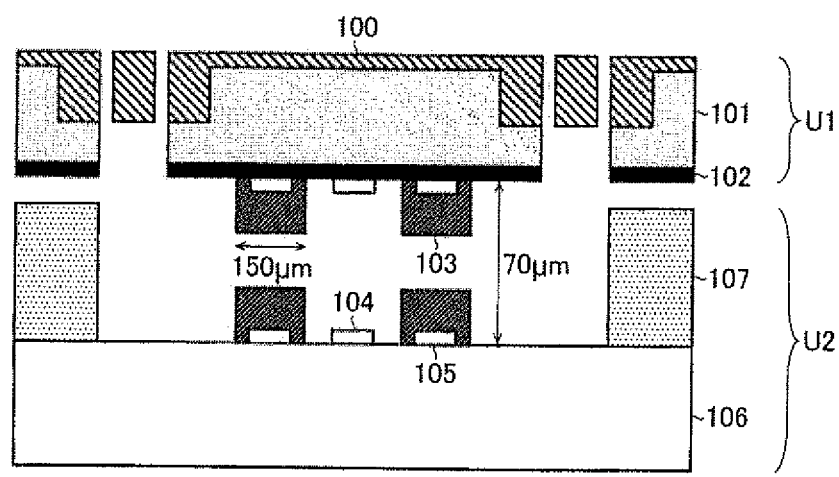
FIG. 54 is a schematic diagram illustrating a conventional example of a vibration power generation apparatus that is manufactured by using MEMS technology.

FIGS. 53A to 53C are cross sectional views illustrating respectively first to third structural examples of the power generation apparatus according to the fourth variation example of the present invention. FIG. 53A illustrates a first structural example (trench formation type), FIG. 53B illustrates a second structural example (silica lamination type), and FIG. 53C illustrates a third structural example (protective layer formation type).

The first structural example (trench formation type) of FIG. 53A has the structure that is illustrated in FIGS. 52A and 52B. Trench portions I3 are formed by wet etching, dry etching using an ICP device or the like, machining (dicing), or laser beam process using an excimer laser or the like on the surface of a ferroelectric substrate I2. Similarly to the gap region between a movable member I1 and the ferroelectric substrate I2, the inside of the trench portion I3 is in a low vacuum state (i.e., not a high vacuum state or an ultra high vacuum state) or is filled with air, inert gas (such as $N_2$), a gas having a discharge preventing effect (e.g., a gas containing $SF_6$ as a main component) or the like. With this structure, the state (relative permittivity) can be equalized between the gap region and the inside of the trench. Note that the gap region and the inside of the trench should not be a high vacuum state or an ultra high vacuum so as to avoid discharge. In this specification, the "low vacuum state" means a state having a pressure of atmospheric pressure to $10^{-1}$ Pa, the "high vacuum state" means a state having a pressure of $10^{-1}$ to $10^{-5}$ Pa, and the "ultra high vacuum state" means a state having a pressure of $10^{-5}$ Pa or lower.

The second structural example of FIG. 53B (silica lamination type) has the structure in which a silica layer I3' (having a relative permittivity of approximately 3) is formed in the trench portion I3 formed in the first structural example of FIG. 53A, so that the surface of the ferroelectric substrate I2 is flattened. With this structure, contact (friction) between the movable member I1 and the ferroelectric substrate I2 can be reduced. In addition, since the surface of the ferroelectric substrate I2 is flattened, structures can be formed on the flattened surface by a surface micromachining method.

The third structural example of FIG. 53C (protective layer formation type) has the structure in which a protective layer I4 is added to the second structural example of FIG. 53B, so as to cover the ferroelectric substrate I2 and the silica layer I3' and to have a horizontal surface with respect to the movable member I1. Note that the protective layer I4 is preferably made of a material having a small friction coefficient such as a fluorocarbon resin. With this structure, the movable member I1 can move to slide smoothly on the surface of a protective layer I4 even if the ferroelectric substrate I2 and the movable member I1 happen to contact with each other. Therefore, a mechanical breakdown of the power generation apparatus can be avoided.

Note that the structure of the present invention can be modified variously from the embodiments and variation examples described above without deviating from the spirit of the invention. In other words, the embodiments described above should be considered as examples and not a limitation in all points. The technical scope of the present invention is defined by not the above description of embodiments but by the attached claims, and should be interpreted to include every modification within the scope of the claims and its equivalent meanings and range.

For instance, the gap between the ferroelectric substrate and the movable member may be in a low vacuum state or may be filled with air, inert gas (such as $N_2$), a gas having a discharge preventing effect (e.g., a gas containing $SF_6$ as a main component) or the like. When the gap is made to be in a low vacuum state, an exhausting step may be used, or it is possible to use a phenomenon that gas goes out through the gap in a high temperature process so that the low vacuum state is created naturally.

In addition, as to the ferroelectric disposed at the position that is opposed to the movable member, the substrate itself may be formed of a ferroelectric material (see FIGS. 3A to 3C and the like), or a ferroelectric layer may be formed on the substrate by a thin film printing technique (see FIGS. 8A to 8F and the like), or a plate-like ferroelectric may be manufactured in another step and may be glued onto the substrate (see FIGS. 14 and 32 and the like).

In addition, as for the industrial applicability of the present invention, the power generation apparatus according to the present invention can be used appropriately as a power source for various sensors or wireless devices.

Note that the above description is made for a best mode embodiment of the present invention, but it is obvious to a skilled person in the art that the disclosed invention can be modified in various methods and other various embodiment can be adopted in a manner different from that described above concretely. Therefore, the attached claims are intended to include every variation of the present invention in the scope without deviating from the spirit and the technical view of the present invention.

What is claimed is:

1. A power generation apparatus comprising:
   a dielectric;
   a movable member being opposed to the dielectric with a predetermined distance;
   an electret and an opposing electrode that are formed on the surface of the movable member facing the dielectric so as to generate a fringe electric field penetrating into the dielectric between the electret and opposing electrode when the moveable member is in a first position relative to the dielectric;
   a metal layer formed on the surface of the dielectric facing the movable member so as to prevent the fringe electric field from penetrating into the dielectric when the moveable member is in a second position relative to the dielectric; and
   a base electrode that is embedded in the movable member and from which a reference potential is taken during power generation, wherein
   when the volume occupancy of the dielectric between the electret and the opposing electrode varies in accordance with a displacement of the movable member, the power generation apparatus outputs the electric charge induced in the opposing electrode as electric current.

2. The power generation apparatus according to claim 1, wherein the metal layer is formed so as to protrude from the surface of the dielectric facing the movable member.

3. The power generation apparatus according to claim 1, wherein the metal layer is formed so as to be embedded in the surface of the dielectric facing the movable member.

4. The power generation apparatus according to claim 1, further comprising a low permittivity insulating film that is formed so as to cover the dielectric and the metal layer and has a horizontal surface with respect to the movable member, the film being made of a material having low sliding friction like fluorocarbon resin or polyimide resin.

5. The power generation apparatus according to claim 1, further comprising a beam portion as a supporting member for the movable member, wherein a length in the thickness direction of the beam portion is larger than a length in the width direction of the same.

6. The power generation apparatus according to claim 1, further comprising an electret terminal for injecting a predetermined amount of electric charge into the electret by contact discharge.

7. The power generation apparatus according to claim 1, wherein the dielectric has a relative permittivity of 1,000 or larger.

8. The power generation apparatus according to claim 1, wherein a gap region between the dielectric and the movable member is in a low vacuum state.

9. The power generation apparatus according to claim 1, wherein a gap region between the dielectric and the movable member is filled with a predetermined gas.

10. The power generation apparatus according to claim 9, wherein the predetermined gas is any one of air, inert gas and a gas having a discharge preventing effect.

11. The power generation apparatus according to claim 10, wherein the gas having a discharge preventing effect contains SF6 as a main component.

12. The power generation apparatus according to claim 1, wherein the power generation apparatus is manufactured by using a surface micromachining technology.

13. The power generation apparatus according to claim 1, wherein the electret is formed on the base electrode in contact therewith.

14. The power generation apparatus according to claim 13, the electret is formed embedded in the surface of the movable member facing the dielectric.

15. The power generation apparatus according to claim 1, wherein the base electrode is electrically grounded.

* * * * *